(12) United States Patent
Ford

(10) Patent No.: US 12,358,435 B2
(45) Date of Patent: Jul. 15, 2025

(54) HEADS-UP DISPLAY VISOR DEVICE FOR AN AUTOMOBILE

(71) Applicant: Rinard Ford, San Francisco, CA (US)

(72) Inventor: Rinard Ford, San Francisco, CA (US)

( * ) Notice: Subject to any disclaimer, the term of this patent is extended or adjusted under 35 U.S.C. 154(b) by 0 days.

(21) Appl. No.: 17/705,183

(22) Filed: Mar. 25, 2022

(65) Prior Publication Data

US 2023/0347737 A1 Nov. 2, 2023

Related U.S. Application Data

(63) Continuation of application No. 16/848,566, filed on Apr. 14, 2020, now Pat. No. 11,285,812.

(Continued)

(51) Int. Cl.
*B60K 35/00* (2024.01)
*B60R 11/02* (2006.01)
*B60R 16/033* (2006.01)
*G02B 27/01* (2006.01)
*G06F 3/16* (2006.01)
*G06V 40/16* (2022.01)
*B60K 35/23* (2024.01)
*B60K 35/28* (2024.01)
*B60K 35/60* (2024.01)
*B60R 11/00* (2006.01)

(Continued)

(52) U.S. Cl.
CPC .......... *B60K 35/00* (2013.01); *B60R 11/0235* (2013.01); *B60R 11/0247* (2013.01); *B60R 16/033* (2013.01); *G02B 27/0101* (2013.01); *G02B 27/0149* (2013.01); *G06F 3/167* (2013.01); *G06V 40/172* (2022.01); *B60K 35/23* (2024.01); *B60K 35/28* (2024.01); *B60K 35/60* (2024.01); *B60K 2360/166* (2024.01); *B60K 2360/167* (2024.01); *B60K 2360/171* (2024.01); *B60K 2360/178* (2024.01); *B60K 2360/777* (2024.01); *B60R 2011/0035* (2013.01); *B60R 2011/0059* (2013.01); *G02B 2027/0138* (2013.01); *G02B 2027/014* (2013.01); *G02B 2027/0141* (2013.01); *G02B 2027/0169* (2013.01); *H02J 7/0045* (2013.01); *H02J 7/35* (2013.01)

(58) Field of Classification Search
CPC .......................... B60K 35/00; B60R 21/0152
See application file for complete search history.

(56) References Cited

U.S. PATENT DOCUMENTS 7,413,233 B1 * 8/2008 Jung ................... B60R 11/0235
  296/97.7
2006/0025698 A1 * 2/2006 Nakagawa ............... A61B 5/18
  600/513

(Continued)

*Primary Examiner* — Nan-Ying Yang
(74) *Attorney, Agent, or Firm* — Matthew C. Lapple; Lapple Ubell IP Law, LLP

(57) ABSTRACT

Embodiments disclosed herein relate to a heads-up display visor for a vehicle, such as an automobile, to provide driver assistance information to the driver. Features include a display screen that is sized and positioned relative to the driver's conventional sun visor, so as to eliminate the need to project images onto the windshield and/or to have a projector located on the vehicle dashboard. In certain embodiments, the heads-up display visor is portable, and is affixed to the driver's conventional sun visor by a clip, thereby allowing a driver to move the device from one vehicle to another.

20 Claims, 31 Drawing Sheets

Related U.S. Application Data

(60) Provisional application No. 62/834,303, filed on Apr. 15, 2019.

(51) Int. Cl.
  *H02J 7/00* (2006.01)
  *H02J 7/35* (2006.01)

(56) References Cited

U.S. PATENT DOCUMENTS

| | | | | |
|---|---|---|---|---|
| 2010/0253489 | A1* | 10/2010 | Cui | G08G 1/165 340/425.5 |
| 2012/0140125 | A1* | 6/2012 | Pepitone | G02B 27/0149 348/800 |
| 2012/0140308 | A1* | 6/2012 | Cordova | B60J 3/04 359/244 |
| 2017/0013188 | A1* | 1/2017 | Kothari | G06F 3/017 |
| 2018/0067547 | A1* | 3/2018 | Russell | G02B 27/0172 |

* cited by examiner

HEADS-UP DISPLAY VISOR DEVICE FOR AN AUTOMOBILE

CROSS-REFERENCE TO RELATED APPLICATIONS

This application claims priority to U.S. Provisional Patent Application No. 62/834,303, filed on Apr. 15, 2019; and U.S. Non-Provisional patent application Ser. No. 16/848,566, filed on Apr. 14, 2020; which will be issued as U.S. Pat. No. 11,285,812 on Mar. 29, 2022; both of which are incorporated by reference herein in their entirety.

FIELD OF THE INVENTION

Embodiments of the present invention relate to a heads-up display visor for an automobile.

BACKGROUND

Various heads-up-display (HUD) systems and devices have been used and implemented in automobiles to provide drivers with visual information in a way that the drivers do not need to take their eyes off the road ahead. However, all such prior art systems and devices known to the present inventor have considerable drawbacks and disadvantages. For example, some drawbacks and disadvantages of various prior art systems include that they are: (a) dashboard mounted and intended to reflect onto the glass of a windshield; (b) cumbersome and complicated to build and use; (c) not portable and able to be moved from vehicle to vehicle. HUD systems that project onto a windshield can be difficult to read if the windshield is dirty, or if there is strong glare. A cumbersome and complicated design should normally be avoided if possible. Further, a lack of portability limits the usefulness of HUD devices for drivers who have more than one automobile, or who rent cars frequently when travelling.

Accordingly, there is a need for a HUD device for an automobile that overcomes these drawbacks and disadvantages.

SUMMARY

Embodiments of the present invention relate to a heads up display for an automobile and a method of use. These embodiments address the drawbacks and disadvantages identified above.

The various embodiments of the present heads up display has several features, no single one of which is solely responsible for its desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments solve the problems discussed in the Background and provide the advantages described herein.

In a first aspect, a heads-up display visor for a vehicle is provided, including a display screen comprising a rigid transparent screen upon which driver assistance information may be projected and reflected so that the driver assistance information is perceivable by a driver, a microprocessor, where the microprocessor is operably connected to a battery, a projector, where the projector is operably connected to the battery, where the projector is operably connected to the microprocessor such that the microprocessor can transmit driver assistance information data to the projector, where the projector is capable of converting the driver assistance information data into a projection image of driver assistance information, and the projector is configured such that it projects the projection image of driver assistance information onto the display screen, a first connector member, hingedly connected to the display screen, a second connector member, connected to the first connector member, a clip, connected to the second connector member, wherein the clip is configured to removably attach the heads-up display visor to a conventional vehicle sun visor.

In an embodiment of the first aspect, the display screen comprises an emissive projector film applied to a rigid transparent substrate.

In another embodiment of the first aspect, the rigid transparent substrate comprises Acrylonitrile Butadiene Styrene ("ABS").

In another embodiment of the first aspect, the projector has a light source with a light source brightness output power of about 2 watts.

In another embodiment of the first aspect, the first connector member and the second connector member are connected such that the first connector member may extend outwardly from the second connector member by telescoping.

In another embodiment of the first aspect, the heads-up display also includes a motion sensor, operatively connected to the microprocessor, where the motion sensor is aligned to sense motion that occurs beyond the driver's peripheral line of sight, wherein the peripheral line of sight is more than 45 degrees away from the driver's forward line of sight, where the microprocessor is operatively configured such that, upon receiving a motion detection signal from the motion sensor, the microprocessor will cause a visual warning signal to appear on the display screen to warn the driver about a hazard beyond the driver's peripheral line of sight.

In another embodiment of the first aspect, the projection image of driver assistance information comprises one or more of vehicle speed information, vehicle performance information, engine condition, tire condition, tachometer information, environmental conditions, heating and air conditioner conditions, entertainment conditions, stereo settings, navigation information, maps, turn-by-turn directions, interface information with other devices, interface information to a smartphone, connectivity information, connectivity to a Bluetooth headset, connectivity to a voice command system, driving condition warnings, an indication that the road is slippery, an indication that a collision is imminent or an indication that the brakes should be applied.

In another embodiment of the first aspect, the battery is rechargeable.

In another embodiment of the first aspect, the battery is operably connected to a solar cell for recharging.

In another embodiment of the first aspect, the heads-up display also includes a USB charging port, and where the battery is operably connected to the USB charging port for recharging.

In another embodiment of the first aspect, the heads-up display also includes an RFID capable emergency button.

In another embodiment of the first aspect, the display screen also includes a ultra-violet ("UV") light sensitive material and where upon exposure to UV light, the UV light sensitive material darkens to act as a sunscreen for the driver, and where upon a reduction in the intensity of the UV light exposure, the UV light sensitive material lightens.

In another embodiment of the first aspect, the heads-up display also includes a radio antenna and a processor sufficient to provide Bluetooth connectivity.

In another embodiment of the first aspect, the heads-up display also includes a microphone and a processor sufficient to provide voice command capability.

In another embodiment of the first aspect, the heads-up display also includes a digital camera and a processor sufficient to provide facial recognition capability to identify the driver as the owner of the heads-up display visor.

In another embodiment of the first aspect, the heads-up display also includes a blood pressure reader.

In another embodiment of the first aspect, the display screen has dimensions of no more than about twelve inches wide and five inches high, such that when in use, the display screen is inside the driver's peripheral line of vision.

In a second aspect, a heads-up display visor is provided, including a display screen comprising a rigid transparent screen upon which driver assistance information may be displayed, a microprocessor, where the microprocessor is operably connected to a power source, and where the microprocessor is operably connected to the display screen so as to cause the screen to display driver assistance information, a first connector member, hingedly connected to the display screen, a second connector member, connected to the first connector member, a clip, where the second connector member is connected to the clip, a battery, where the clip is connected to the second connector member and is further configured to removably attach the heads-up display visor to a conventional vehicle sun visor, such that the heads-up display visor is not permanently attached to a vehicle and is portable.

In an embodiment of the second aspect, the screen comprises a liquid crystal display ("LCD") screen.

In another embodiment of the second aspect, the screen comprises a light emitting diode ("LED") screen.

In a third aspect, a heads-up display visor is provided, including a display screen comprising a rigid transparent screen upon which driver assistance information may be displayed, a microprocessor, where the microprocessor is operably connected to a power source, and where the microprocessor is operably connected to the display screen so as to cause the screen to display driver assistance information, a first connector member, hingedly connected to the display screen, a second connector member, connected to the first connector member, where the second connector member is connected to the conventional sun visor of a vehicle.

In an embodiment of the third aspect, the heads-up display visor is integral to the conventional sun visor of a vehicle.

BRIEF DESCRIPTION OF THE FIGURES

In the descriptions that follow, like parts or steps are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein.

DESCRIPTION OF THE EMBODIMENTS

Embodiments described herein relate to a "heads-up display" or "HUD" visor for vehicles, particularly automobiles. In general, the HUD visor is either integral to, or affixed to, the conventional driver's side sun visor.

Figure 1:
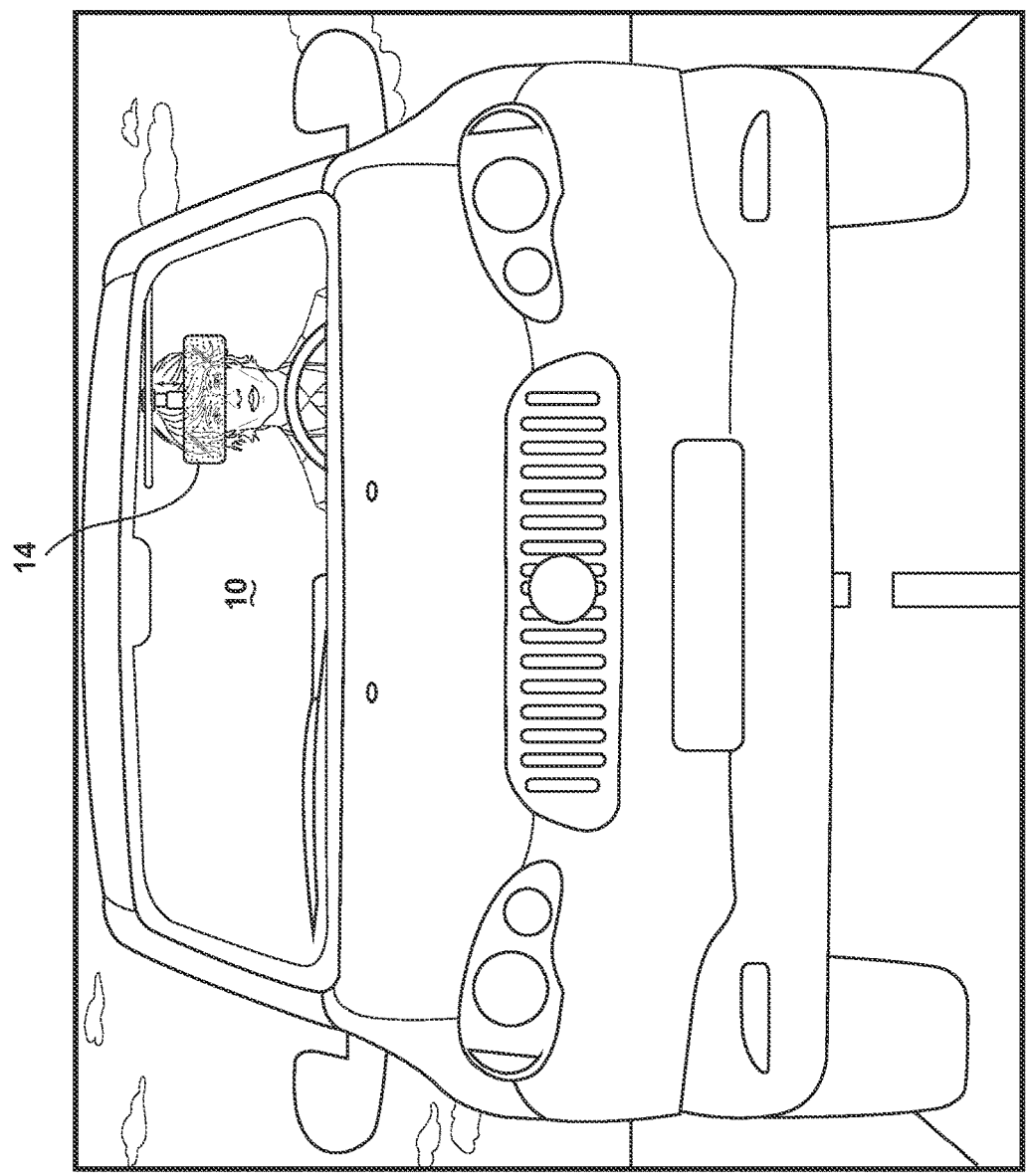
FIG. 1 illustrates a front view of an automobile, in the daylight, with an embodiment of the disclosed HUD Visor deployed in the driver's field of vision.
Figure 2:
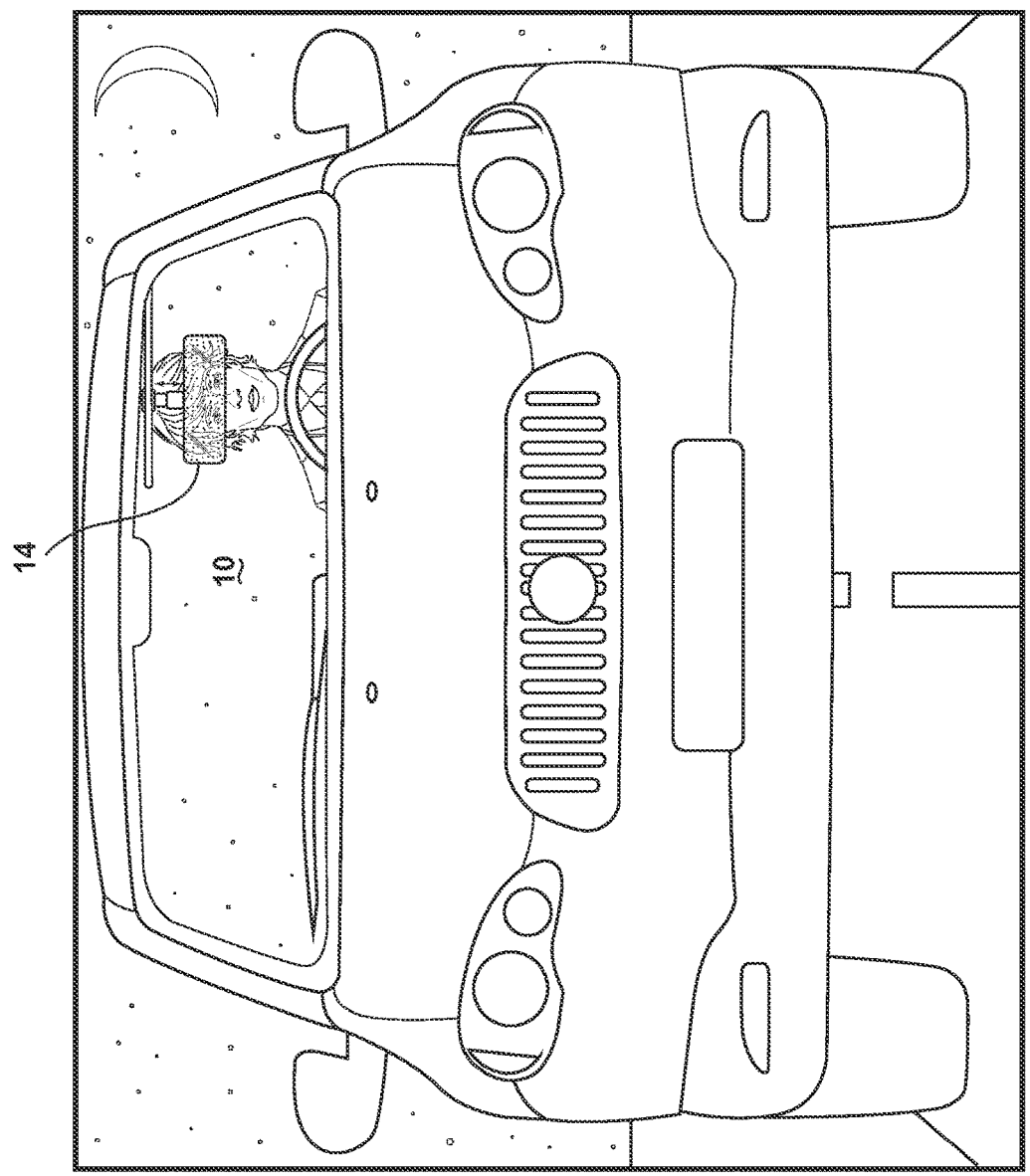
FIG. 2. illustrates a front view of an automobile, at night, with an embodiment of the disclosed HUD Visor deployed in the driver's field of vision.
Figure 3:
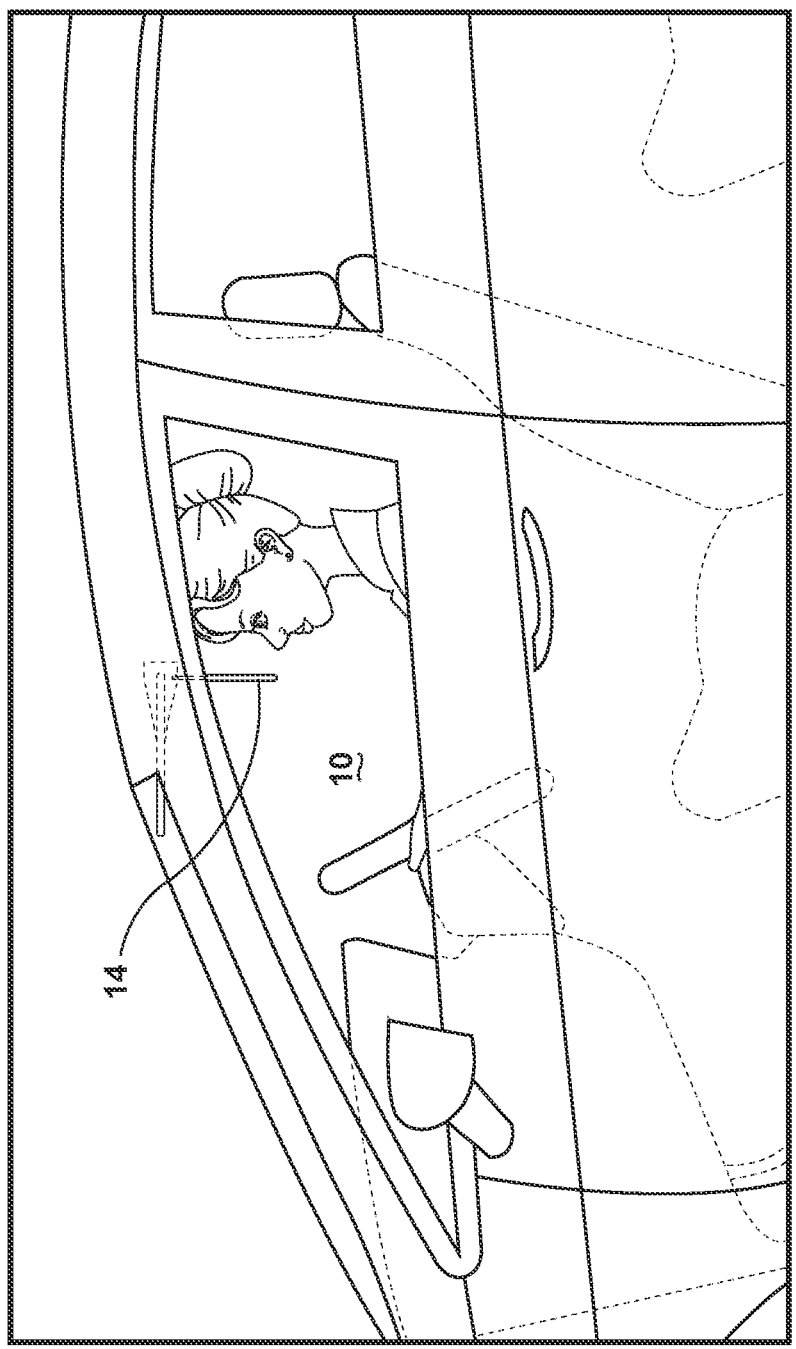
FIG. 3 illustrates a side of an automobile, in the daylight, with an embodiment of the disclosed HUD Visor clipped to the existing automobile visor, and the HUD screen deployed in the driver's field of vision.
Figure 4:
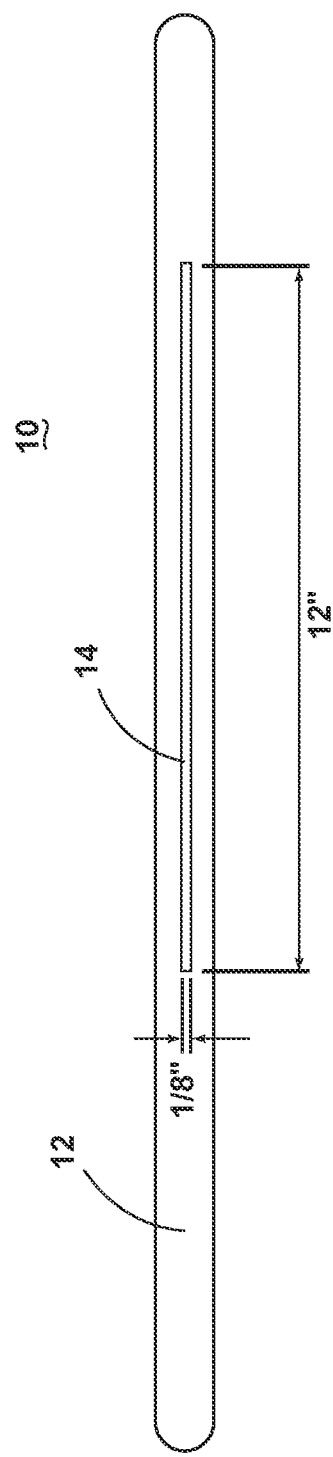
FIG. 4 illustrates a schematic front view of an embodiment of the disclosed HUD Visor, which is built into the driver's automobile visor, and with the HUD screen in a closed position so that it is retracted into the driver's automobile visor.
Figure 5:
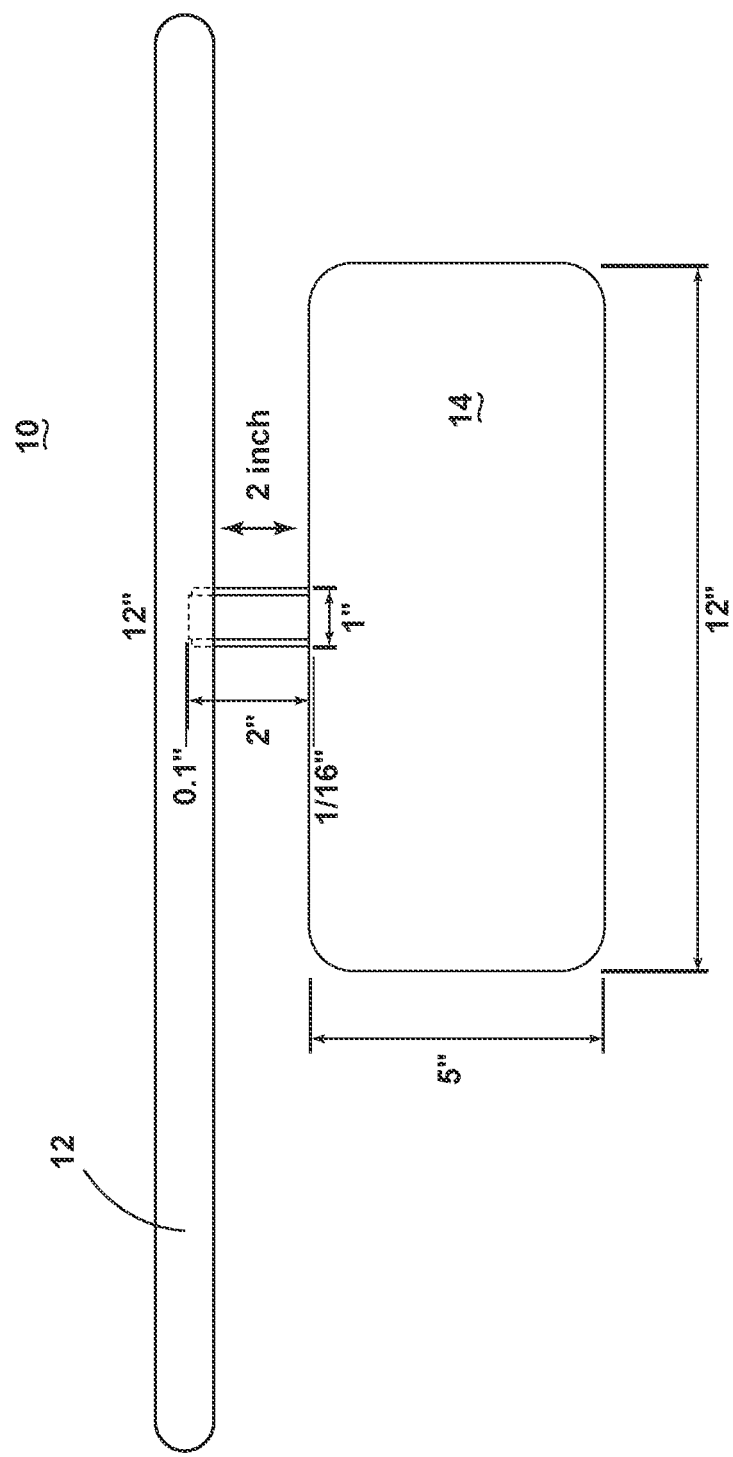
FIG. 5 illustrates a schematic front view of the HUD Visor of FIG. 4, with the HUD screen in a deployed position.
Figure 6:
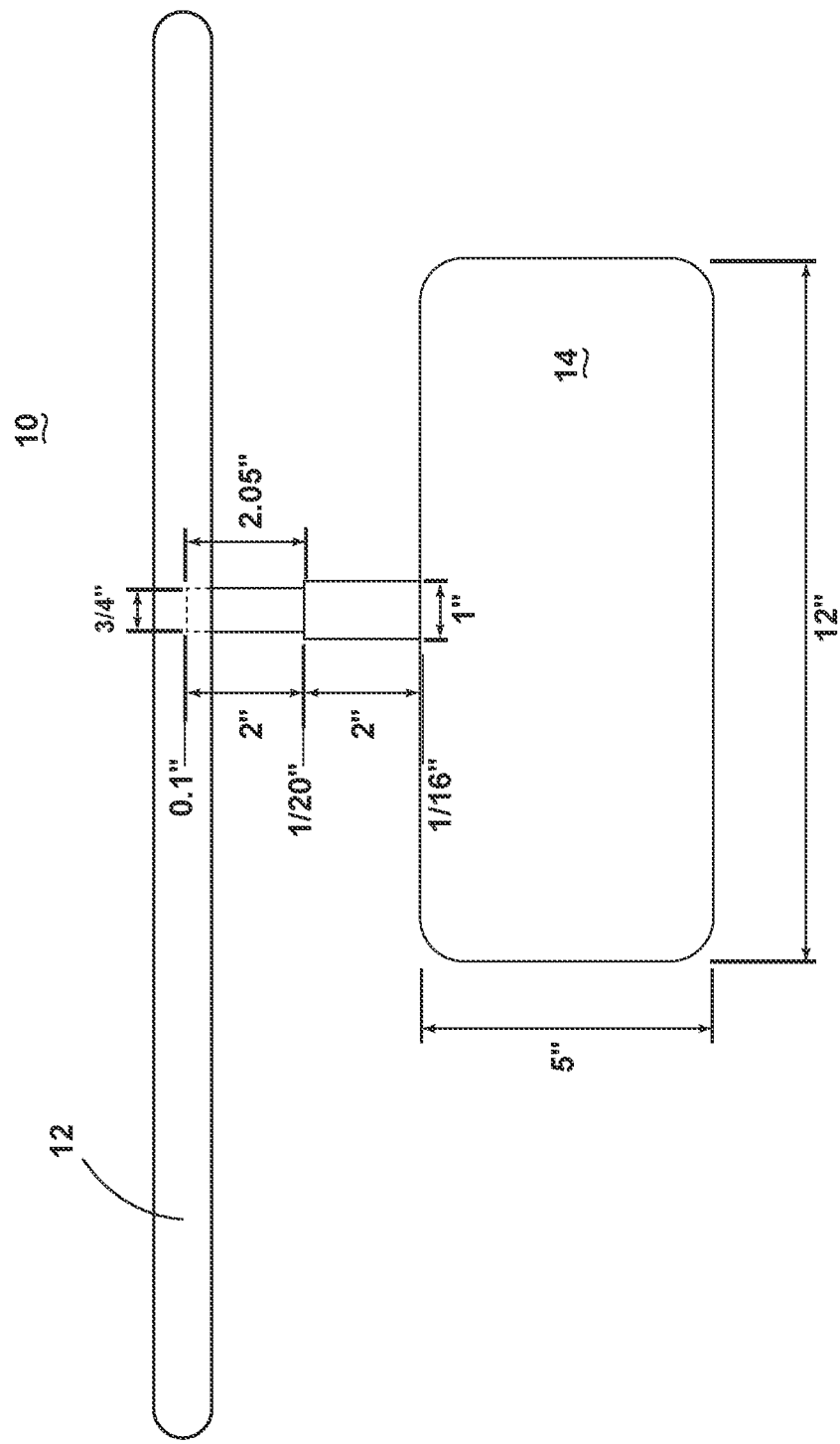
FIG. 6 illustrates a schematic front view of the HUD Visor of FIG. 4, with the HUD screen in a second deployed position, suitable for drivers of shorter stature.
Figure 7:
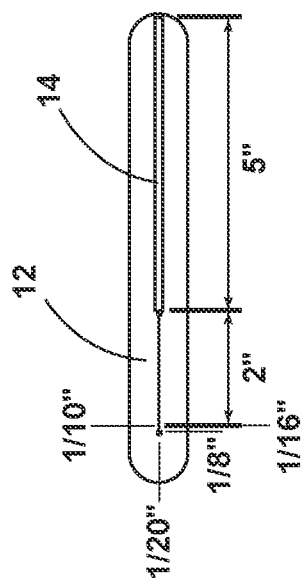
FIG. 7 illustrates a schematic side view of the HUD Visor of FIG. 4, with the HUD screen in a closed and retracted position.
Figure 8:
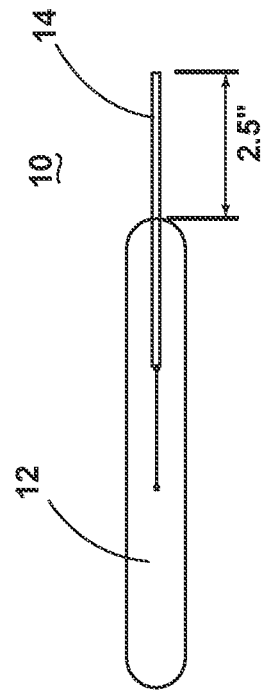
FIG. 8 illustrates a schematic side view of the HUD Visor of FIG. 4, with the HUD screen in a first intermediate partially extended position, as it would be at an early point in the deployment process.
Figure 9:
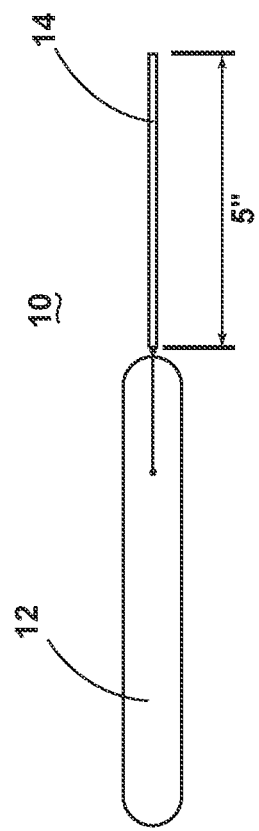
FIG. 9 illustrates a schematic side view of the HUD Visor of FIG. 4, with the HUD screen in a second intermediate partially extended position, as it would be at an a next point in the deployment process.
Figure 10:
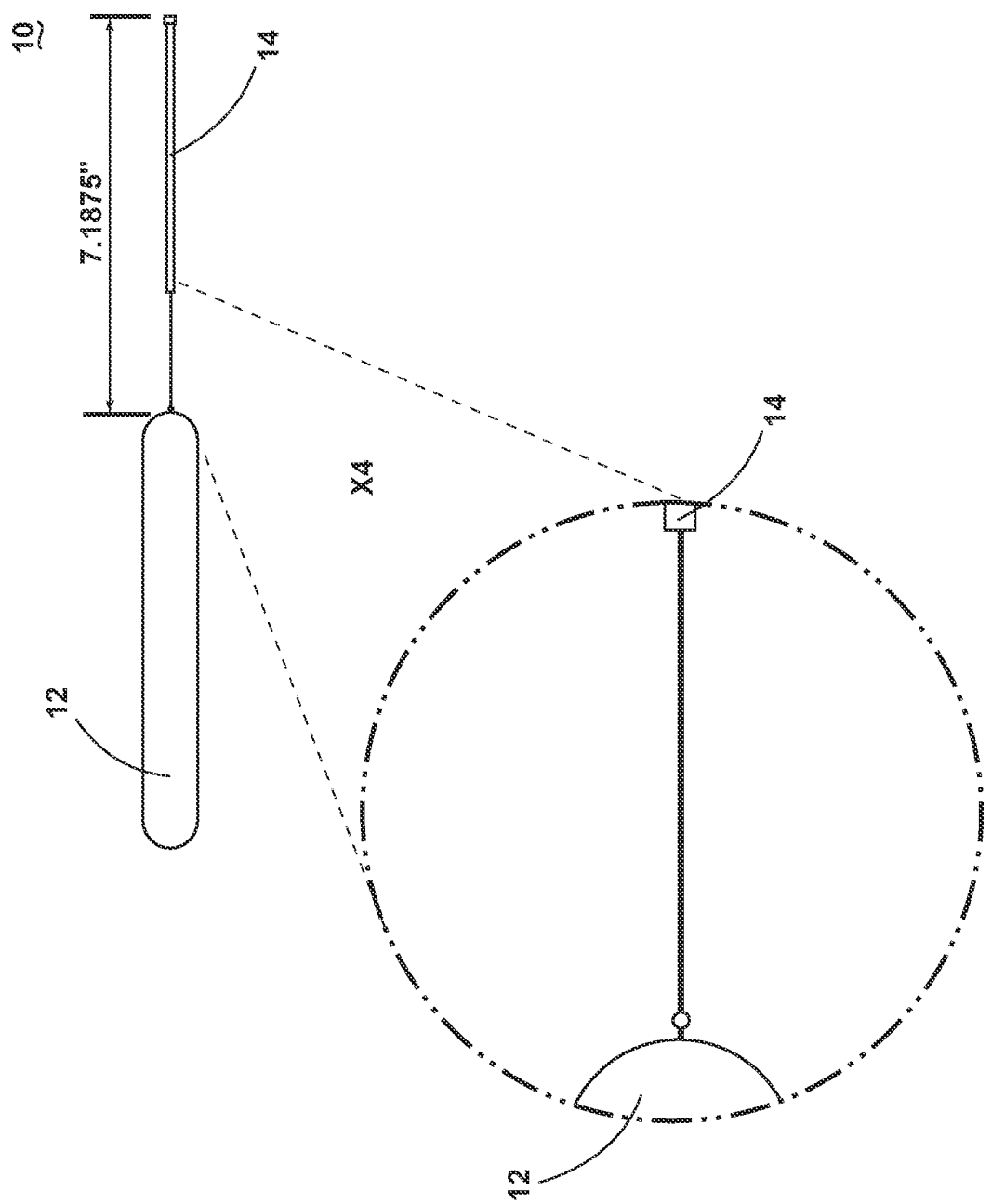
FIG. 10 illustrates a schematic side view of the HUD Visor of FIG. 4, with the HUD screen in a third intermediate partially extended position, as it would be at an a next point in the deployment process immediately prior to swiveling downward, and further includes a magnified section showing further detail of the connection between the HUD screen and the main visor structure.
Figure 11:
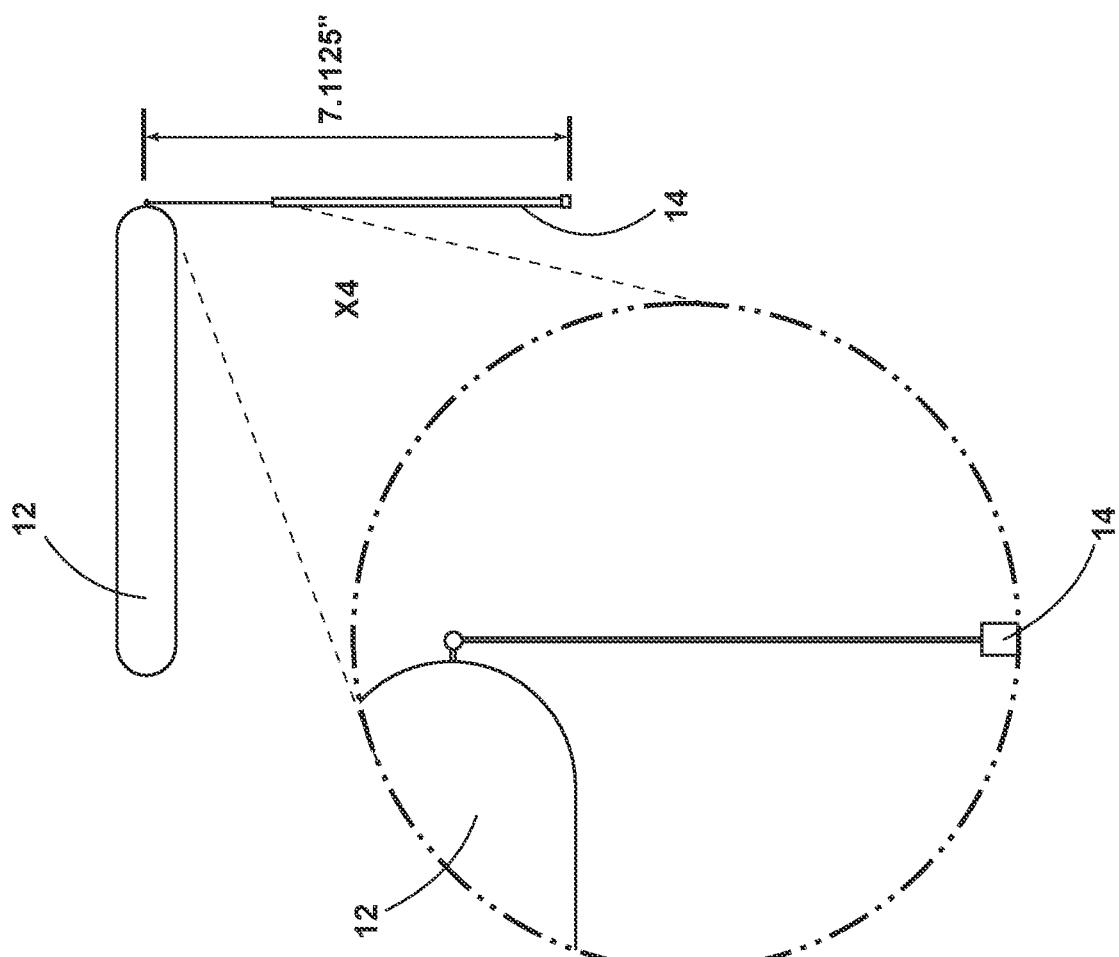
FIG. 11 illustrates a schematic side view of the HUD Visor of FIG. 4, with the HUD screen in a first deployed position, as it would be used by taller drivers, with the HUD screen swiveled downward, and further includes a magnified section showing further detail of the connection between the HUD screen and the main visor structure.
Figure 12:
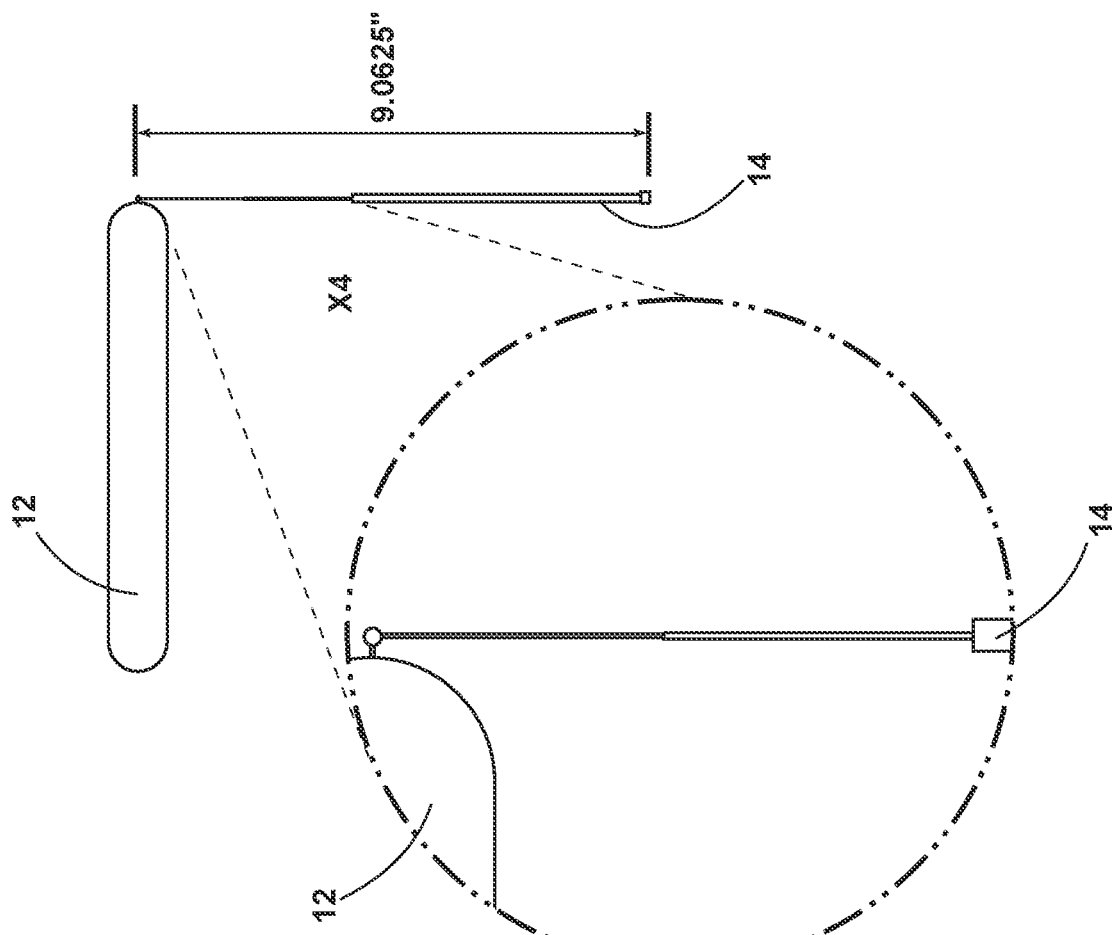
FIG. 12 illustrates a schematic side view of the HUD Visor of FIG. 4, with the HUD screen in a second deployed position, as it would be used by shorter drivers, with the HUD screen swiveled downward, and further includes a magnified section showing further detail of the connection between the HUD screen and the main visor structure.
Figure 13:
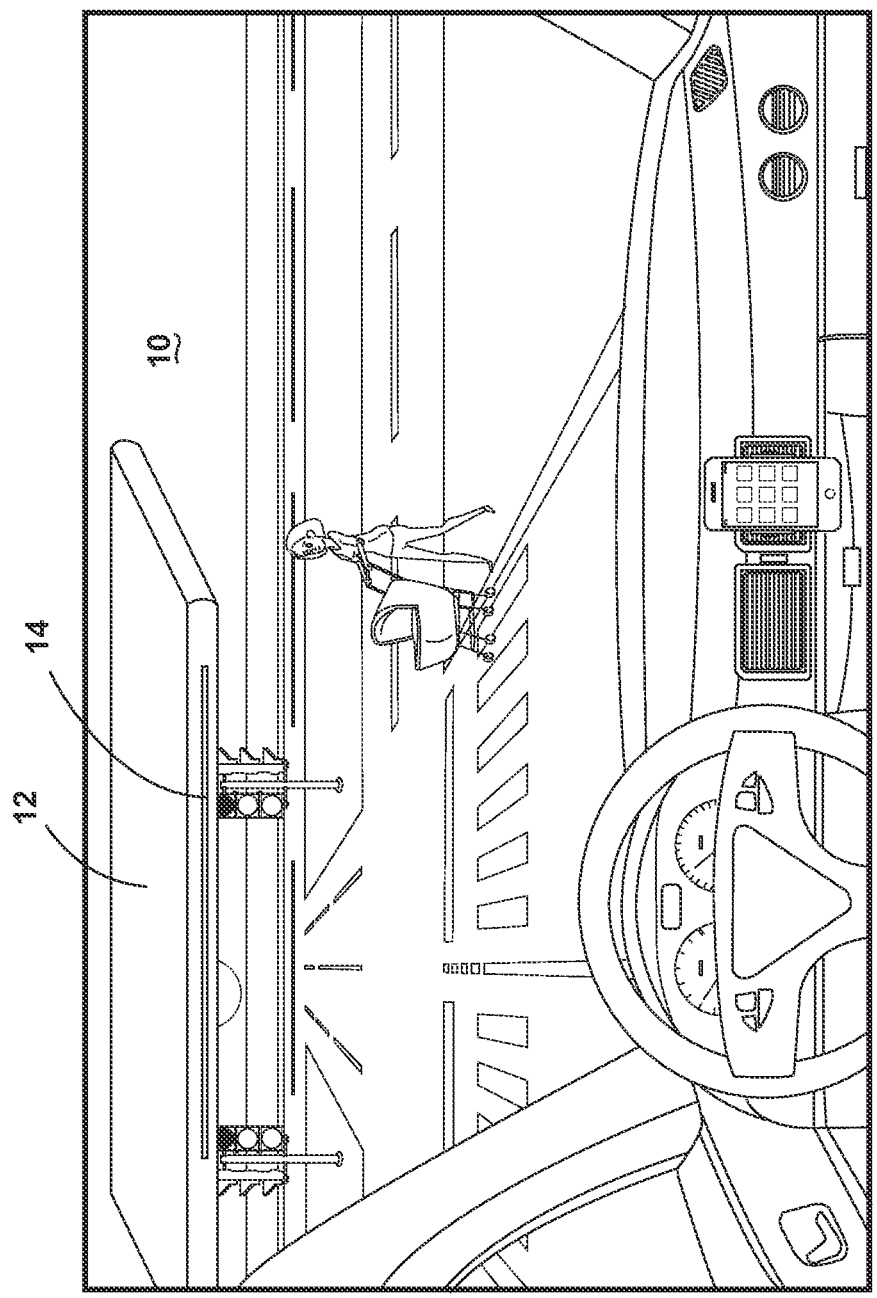
FIG. 13 illustrates a driver's view of the HUD Visor of FIG. 4, with the HUD screen in a closed and retracted position in the main visor structure.
Figure 14:
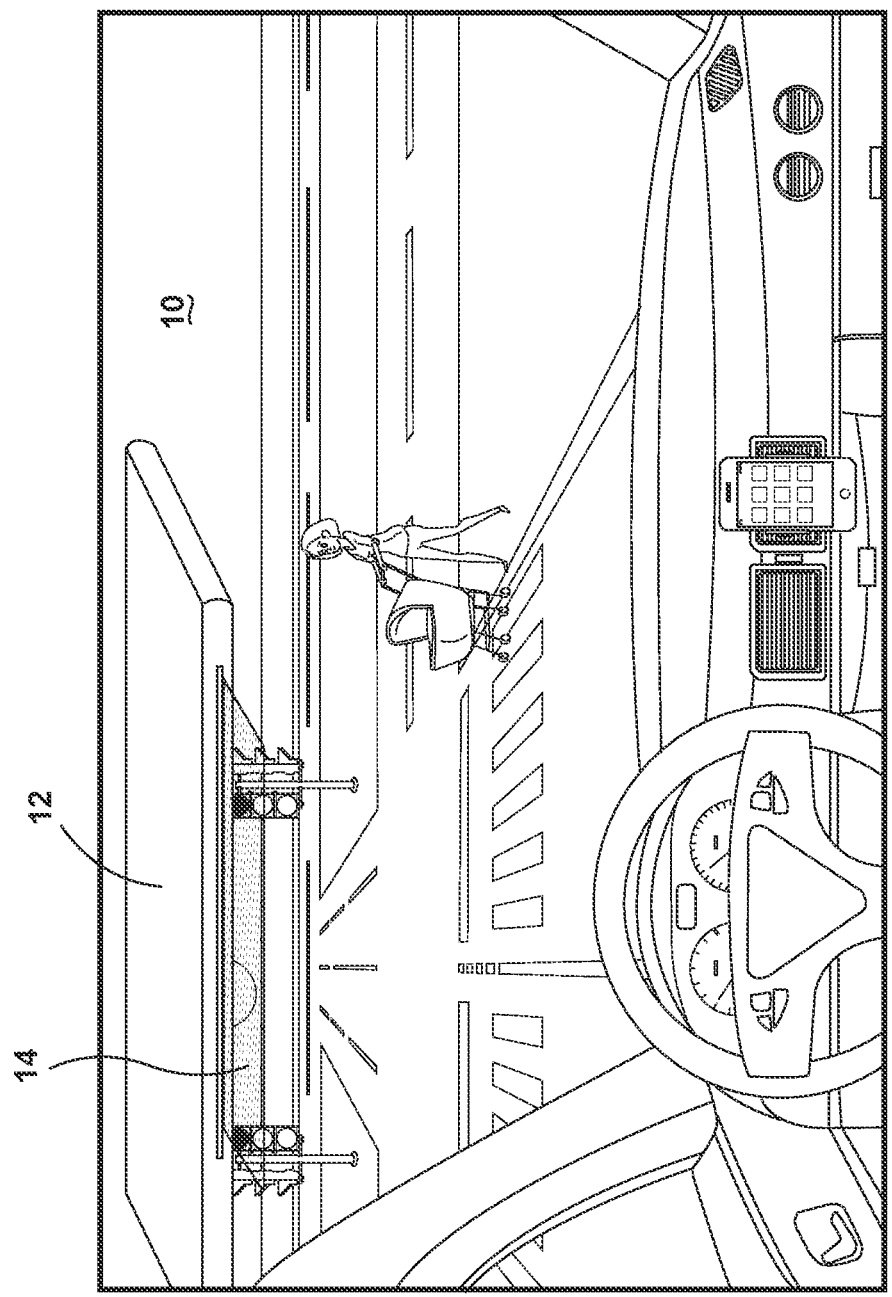
FIG. 14 illustrates a driver's view of the HUD Visor of FIG. 4, with the HUD screen in a first intermediate partially extended position, corresponding to the position shown in FIG. 8.
Figure 15:
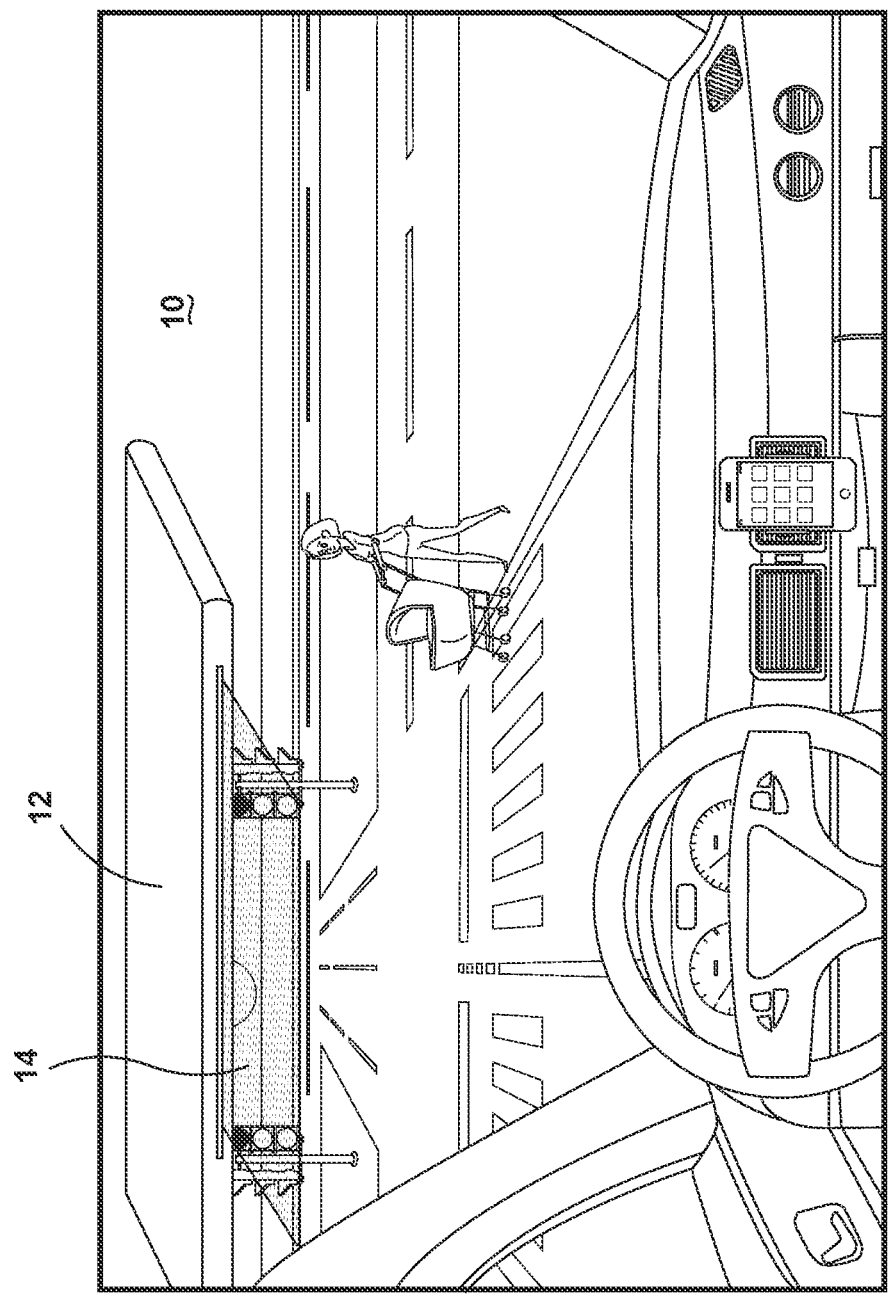
FIG. 15 illustrates a driver's view of the HUD Visor of FIG. 4, with the HUD screen in a second intermediate partially extended position, corresponding to the position shown in FIG. 9.
Figure 16:
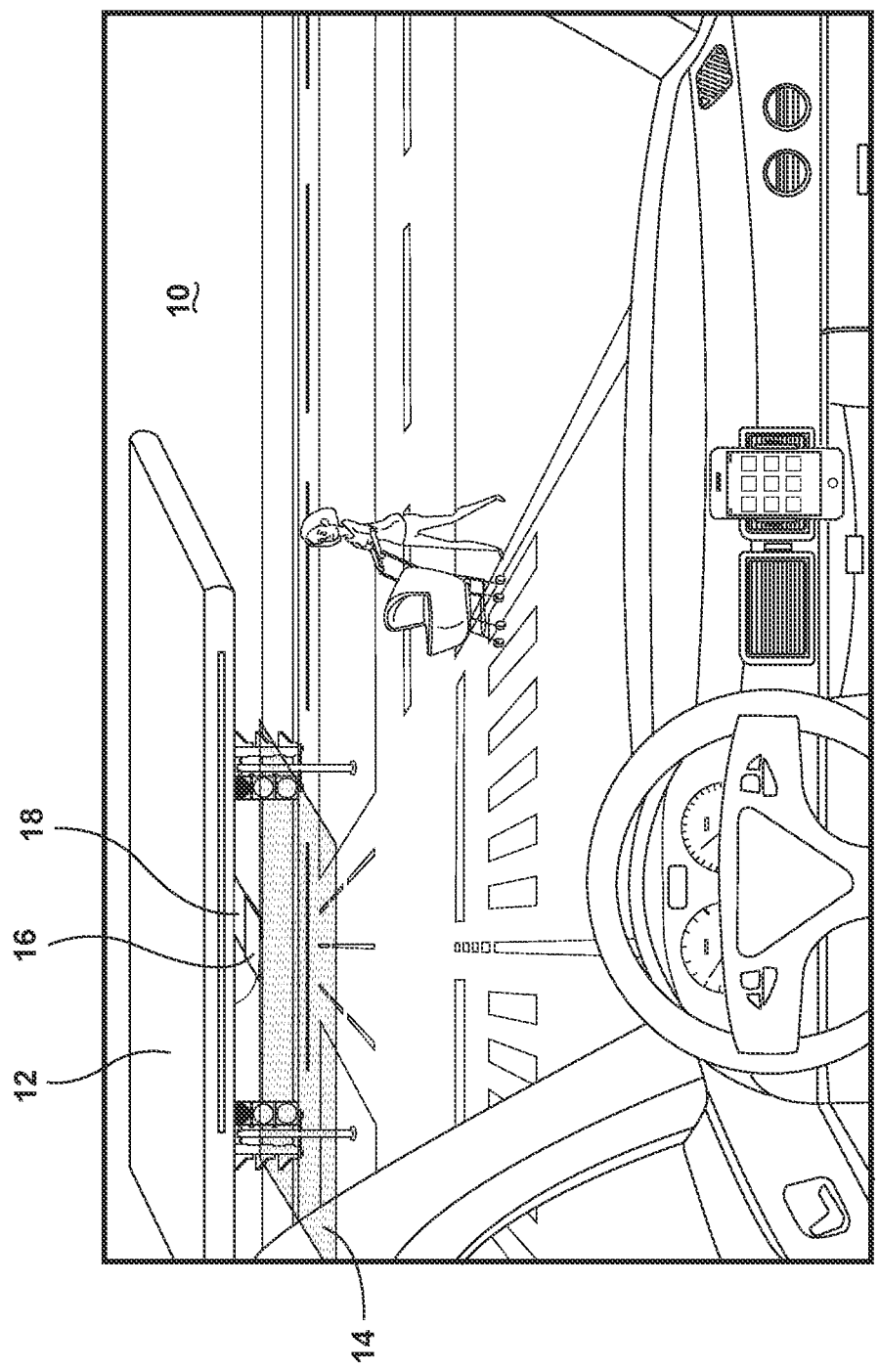
FIG. 16 illustrates a driver's view of the HUD Visor of FIG. 4, with the HUD screen in a with the HUD screen in a third intermediate partially extended position, corresponding to the position shown in FIG. 10.
Figure 17:
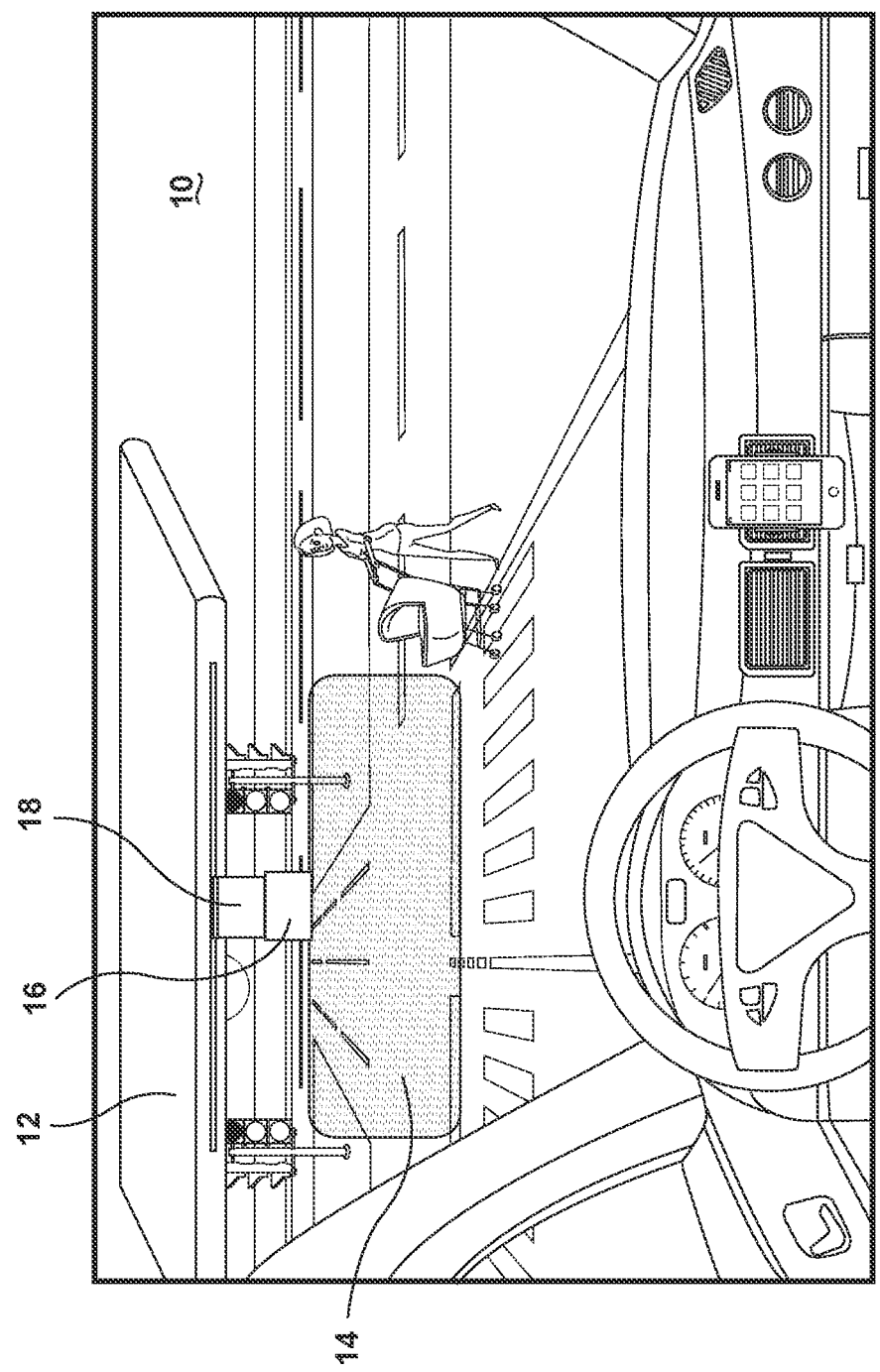
FIG. 17 illustrates a driver's view of the HUD Visor of FIG. 4, with the HUD screen in a with the HUD screen in a first deployed position, corresponding to the position shown in FIG. 11.
Figure 18:
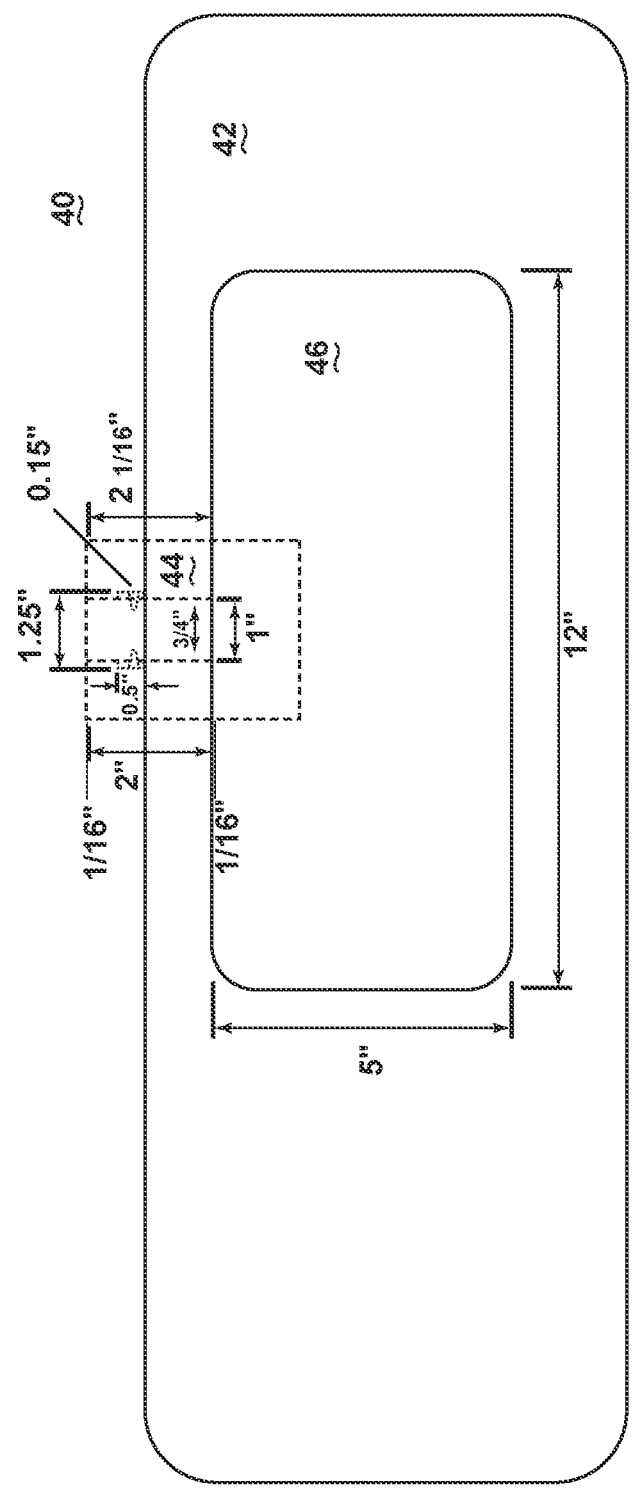
FIG. 18 illustrates a schematic top view of a second embodiment of the disclosed HUD Visor, which is removably affixed to the driver's automobile visor, and with the HUD screen in a closed position so that it is closed generally parallel to the driver's automobile visor.
Figure 19:
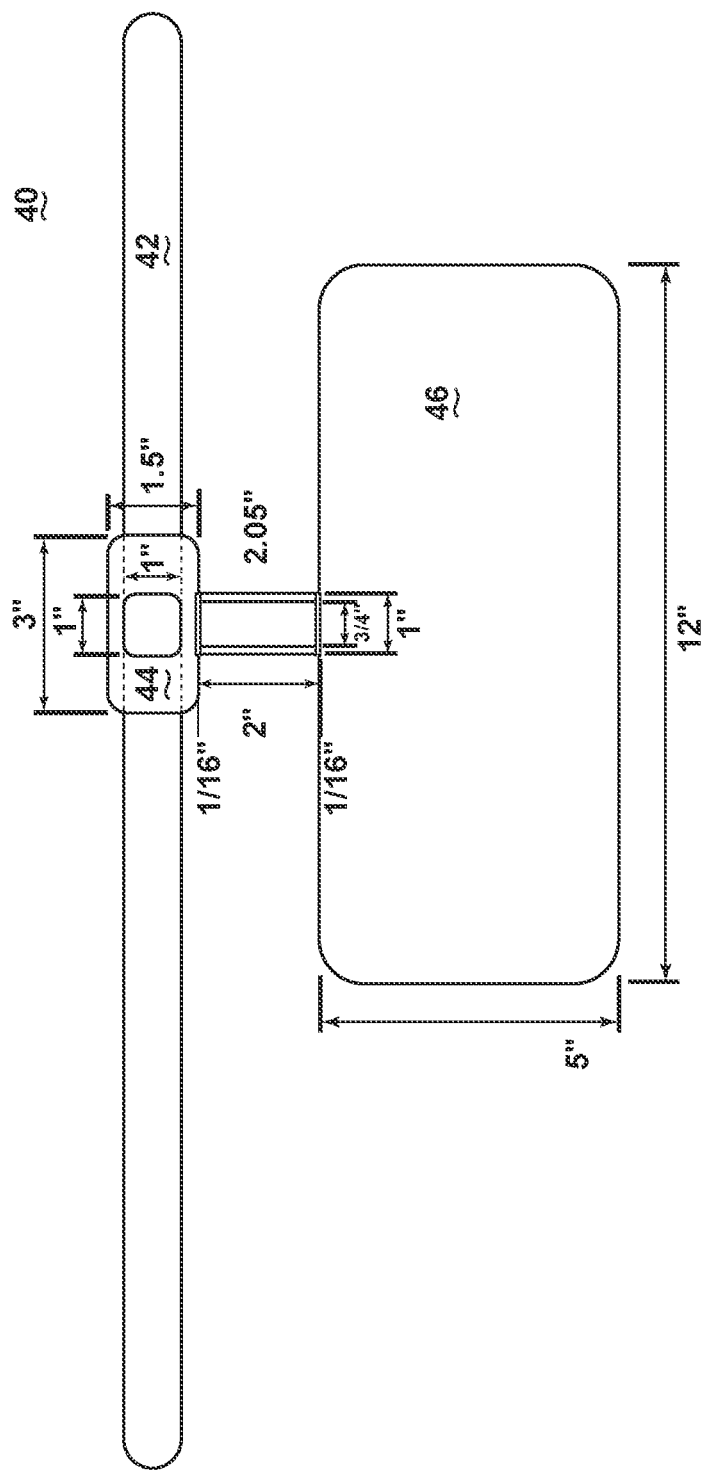
FIG. 19 illustrates a schematic front view of the removable HUD Visor of FIG. 18, with the HUD screen in a first deployed position for taller drivers.
Figure 20:
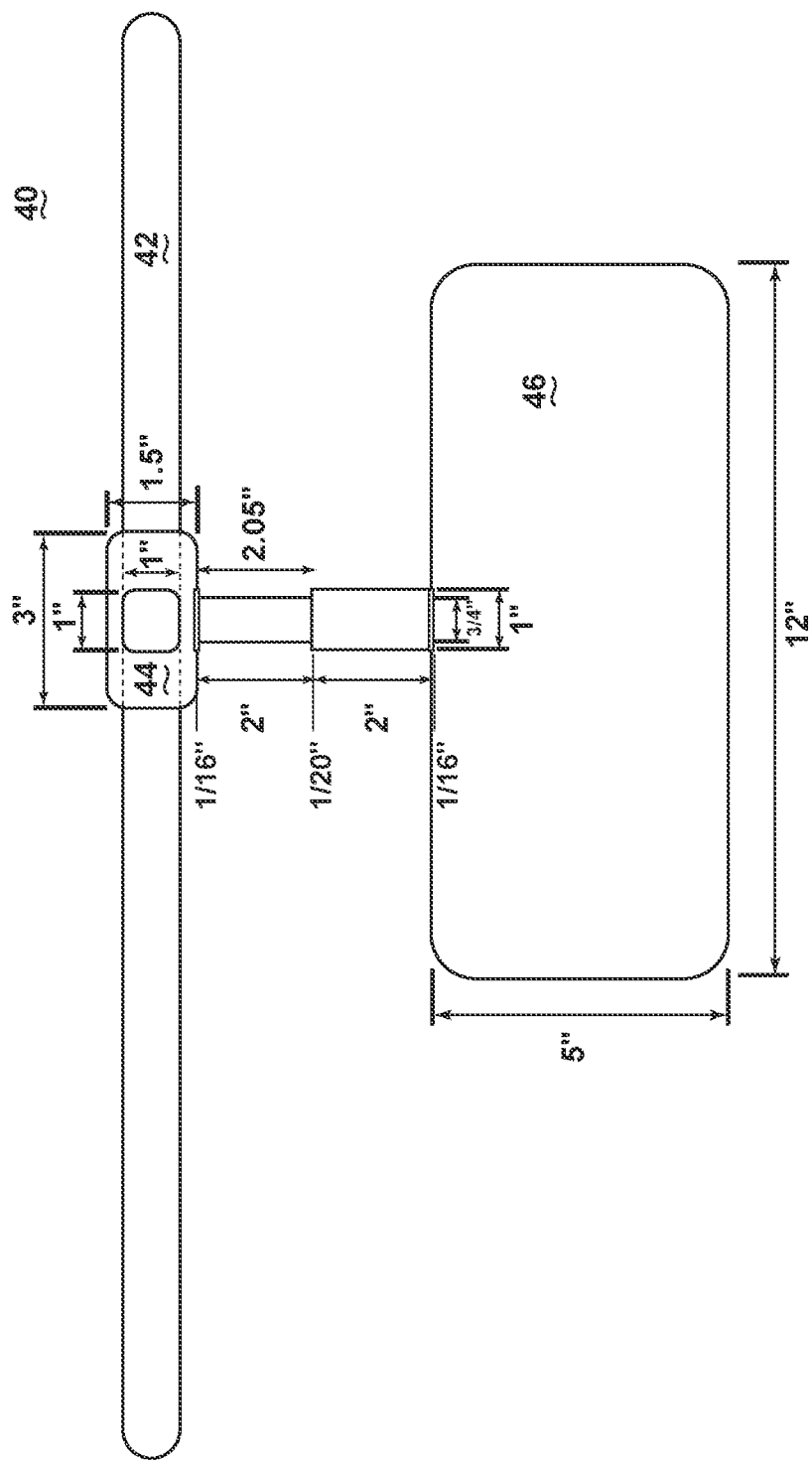
FIG. 20 illustrates a schematic front view of the removable HUD Visor of FIG. 18, with the HUD screen in a second deployed position for shorter drivers.
Figure 21:
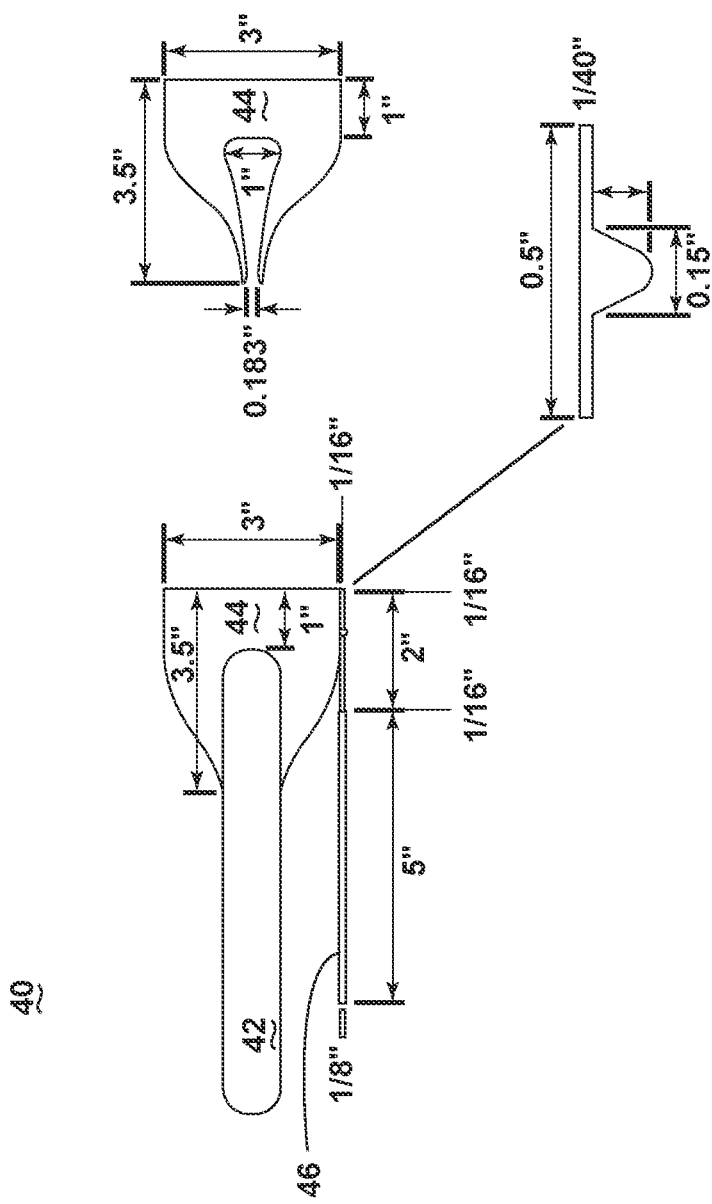
FIG. 21 illustrates a schematic side view of the removable HUD Visor of FIG. 18, with the HUD screen in a closed position that is generally parallel to the driver's automobile visor, and a separate call-out illustration of a schematic side view of the HUD Visor attachment clip.
Figure 22:
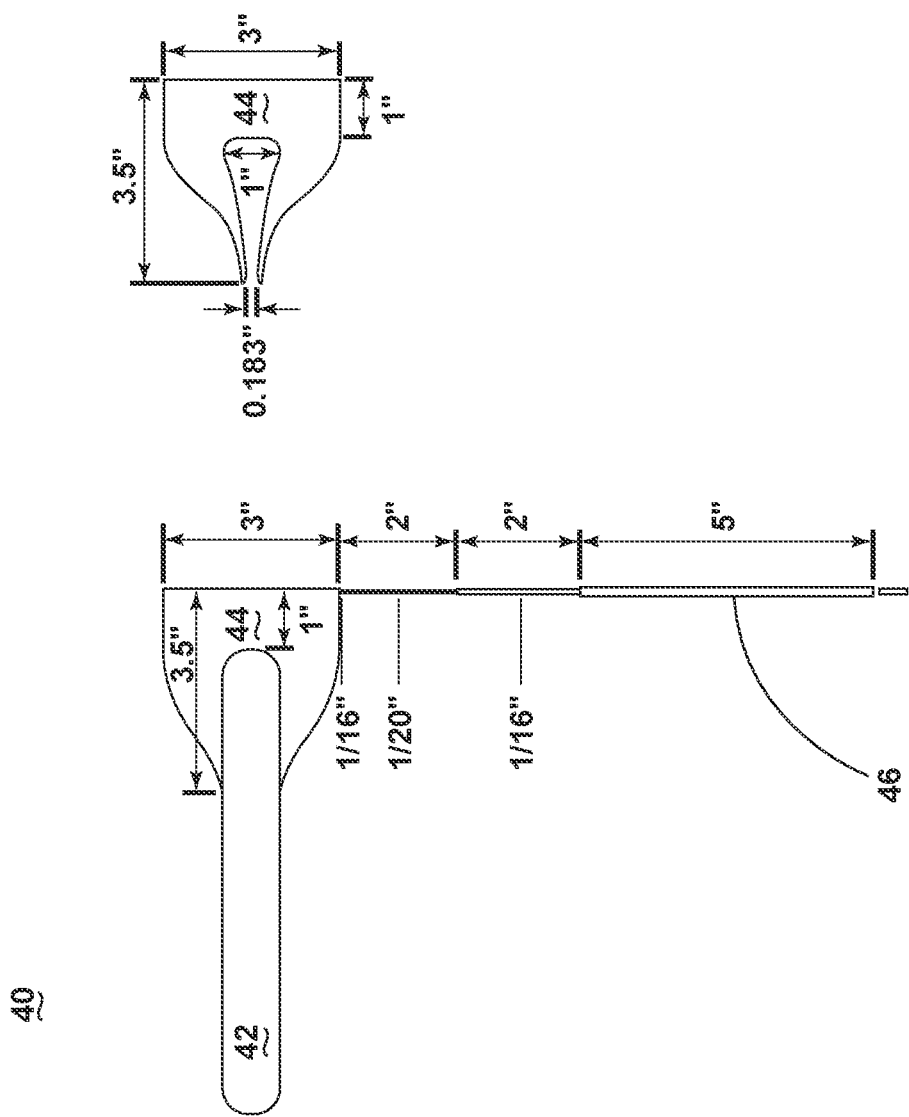
FIG. 22 illustrates a schematic side view of the removable HUD Visor of FIG. 18, with the HUD screen in a deployed position that is generally perpendicular to the driver's automobile visor, so that it is in the driver's field of vision, and a separate call-out illustration of a schematic side view of the HUD Visor attachment clip.

With reference to FIGS. 1-3, an embodiment of a HUD visor 10, in a deployed position, are illustrated. In FIG. 1, the HUD visor 10 is deployed during daytime hours. The HUD visor 10 is equipped with a light sensor (not shown) and based on the output of that light sensor, and/or based on driver input, the HUD display screen 14 may be tinted to reduce road glare and improve the driver's vision. In FIG. 2, the HUD visor 10 is deployed during nighttime hours. The HUD visor 10 light sensor has sensed the lack of light and has transitioned to remove the tint for nighttime driving conditions. When deployed, the HUD visor display screen 14 may be adjusted upwardly or downwardly by the driver to account for driver height and ensure that the HUD visor display screen 14 is in the driver's field of view. All embodiments disclosed herein are generally transparent and enable a driver to see through them, so as to observe road conditions. At the same time, all embodiments disclosed herein include electronics such as a microprocessor, a connection to a power source in the vehicle, (or a battery and recharging port), memory and expected electrical connections to enable the presentation of digital information on the HUD display screen 14 during operation. Suitable electronics may include liquid crystal display (LCD), light emitting diode (LED) or other known screen display technologies. Information presented on the HUD display screen 14 may include, without limitation, vehicle speed information, vehicle performance information, such as engine condition, tire condition, and tachometer information, environmental conditions, such as heating and air conditioner settings, entertainment conditions, such as stereo settings, navigation information, such as maps or turn-by-turn directions, interface information with other devices, such as interface information to a smartphone, connectivity information, such as connectivity to a Bluetooth headset or a voice command system, or driving condition warnings, such as indications that the road is slippery, or that a collision is imminent and the brakes should be applied.

With reference to FIGS. 4-12, an embodiment of the HUD visor 10 that is integrated into a conventional driver's side automobile visor 12 is illustrated. Dimensions of this embodiment of the HUD visor 10 that are provided on FIGS. 4-12 are preferred, as they enable the HUD visor 10 to be conveniently directly in front of the driver's eyes, and they are helpful in addressing the peripheral vision issues discussed further below. However, it should be understood that the dimensions shown are non-limiting to the scope of embodiments of the invention, unless specifically claimed. The HUD visor 10 of FIGS. 4-12 may include a motor (not shown) to automatically deploy the HUD screen 14 upon activation of the automobile or user instructions. Alternatively, the HUD visor 10 may be deployed by hand by a driver.

With reference to FIGS. 13-17, a driver's perspective view of the integrated HUD visor 10, when the HUD display screen 14 is deployed and adjusted for driver height, is shown. This driver's height adjustability is accomplished, in the disclosed embodiment, by use of first connector 16 and a second connector 18. The first connector 16 is connected to the display screen 14. Preferably, the first connector 16 is connected to the display screen 14 by a hinge, or a ball joint, which allows the display screen to be adjusted as to its orientation to the driver's vision. Preferably, the first connector 16 and the second connector 18 are connected via a telescoping arrangement, by which one or the other of the first connector 16 and the second connector 18 can recede within the other. The second connector 18 is connected to the conventional driver's side automobile visor 12.

With reference to FIGS. 18-22, a second embodiment of the HUD visor 40 that is portable, and which may be clipped onto any exiting automobile visor 42, is illustrated. Dimensions of this embodiment of the HUD visor 40 that are provided on FIGS. 18-22 are preferred, but should be understood as non-limiting to the scope of the embodiments, unless specifically claimed. The portability of the HUD visor 40 is achieved, in part, by the use of a visor clip 44, which may be removably affixed to an existing automobile visor 42, as shown. The HUD visor 40 of FIGS. 18-22 may include a motor (not shown) to automatically deploy the HUD display screen 46 upon activation of the automobile or user instructions. Alternatively, the HUD visor display screen 46 may be deployed by hand motion of a driver.

Figure 23:
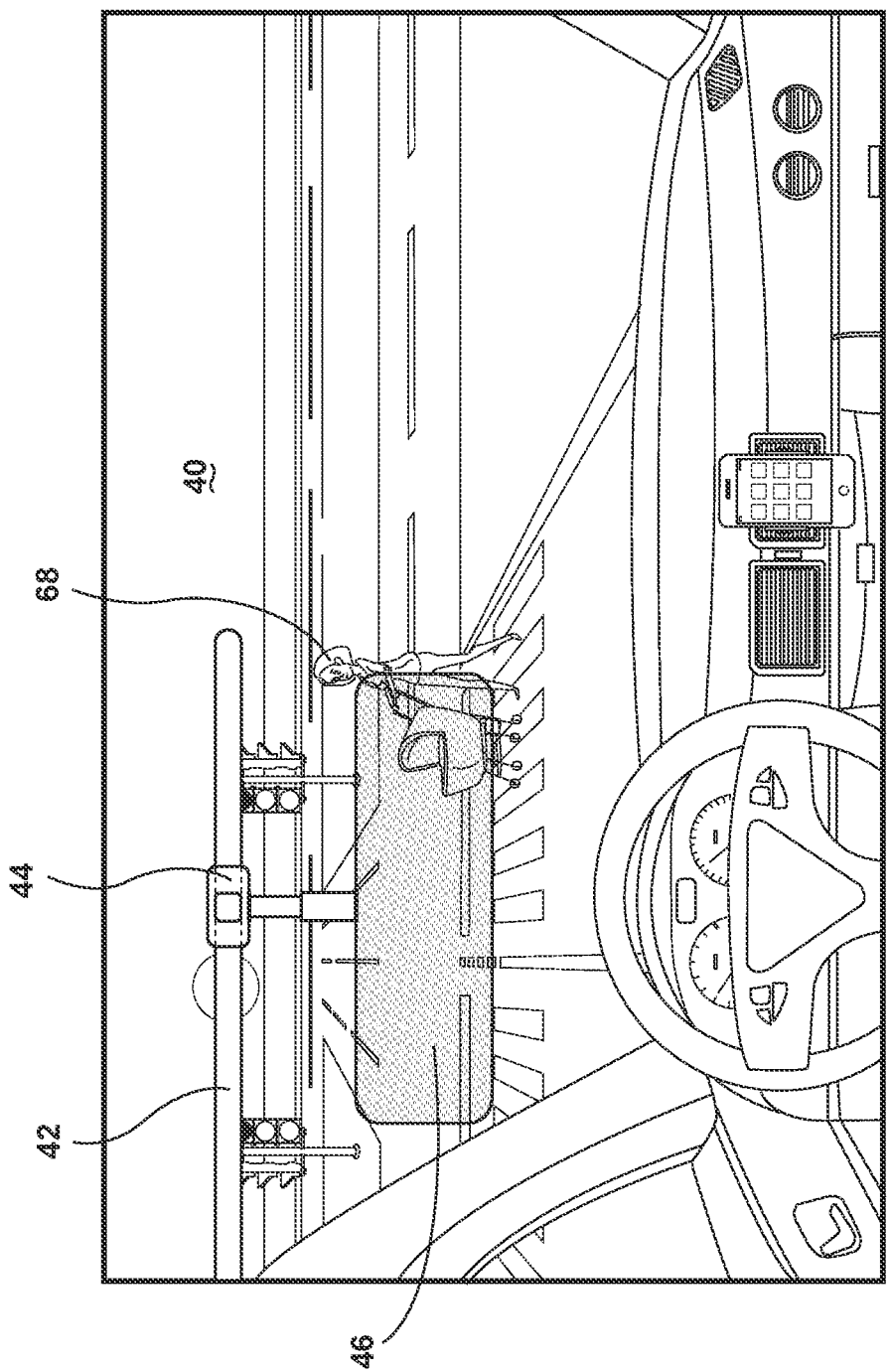
FIG. 23 illustrates a driver's view of the HUD Visor of FIG. 18, with the HUD screen in a first deployed position, corresponding to the position shown in FIG. 19.
Figure 24:
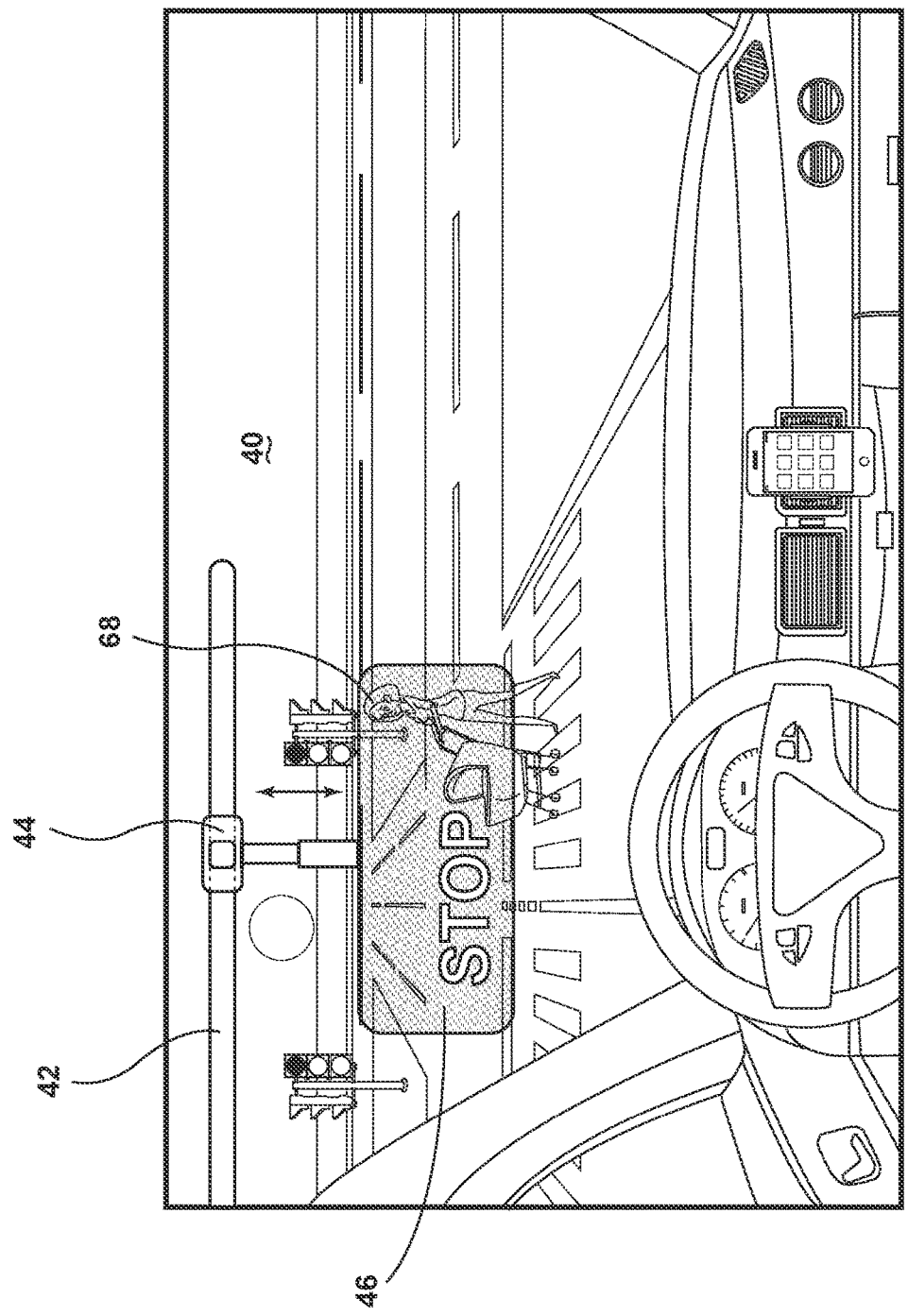
FIG. 24 illustrates a driver's view of the HUD Visor of FIG. 18, with the HUD screen in a second deployed position, corresponding to the position shown in FIG. 20.
Figure 25:
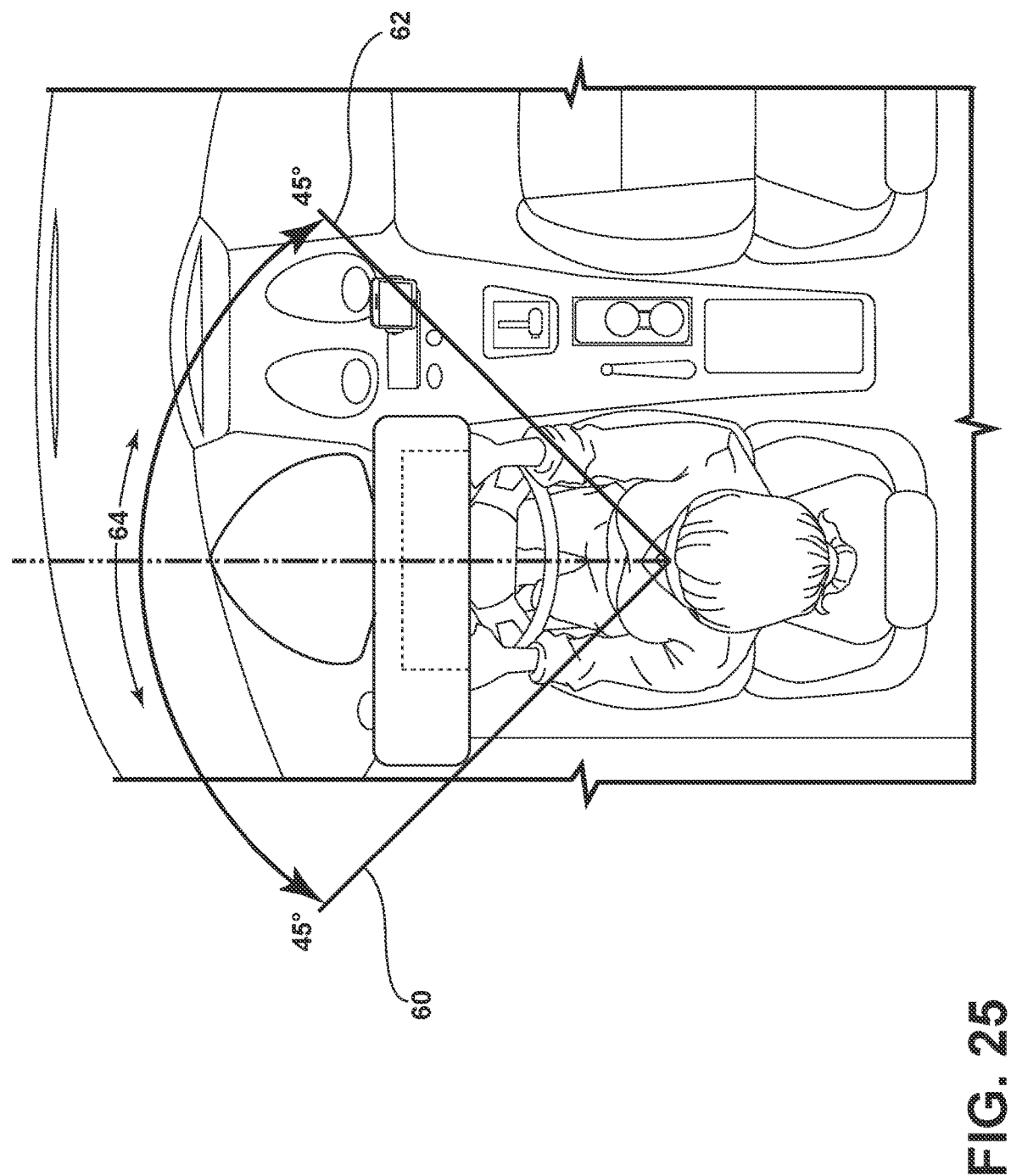
FIG. 25 illustrates a top view of the HUD Visor of FIG. 4, in place in a vehicle, with the HUD screen in a closed and retracted position, and further illustrating a typical driver's field of vision.
Figure 26:
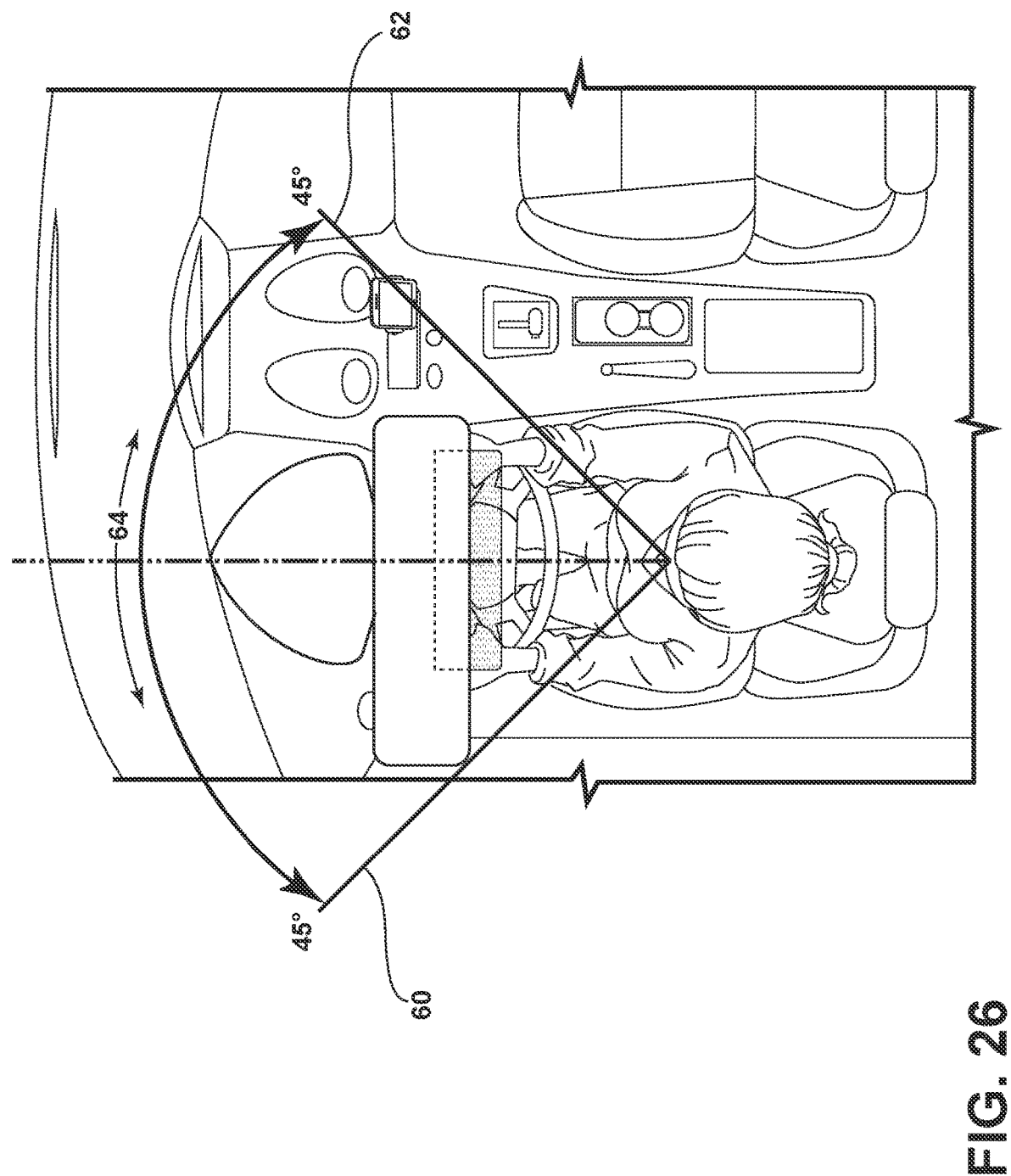
FIG. 26 illustrates a top view of the HUD Visor of FIG. 4, in place in a vehicle, with the HUD screen in a first intermediate position, and further illustrating a typical driver's field of vision.
Figure 27:
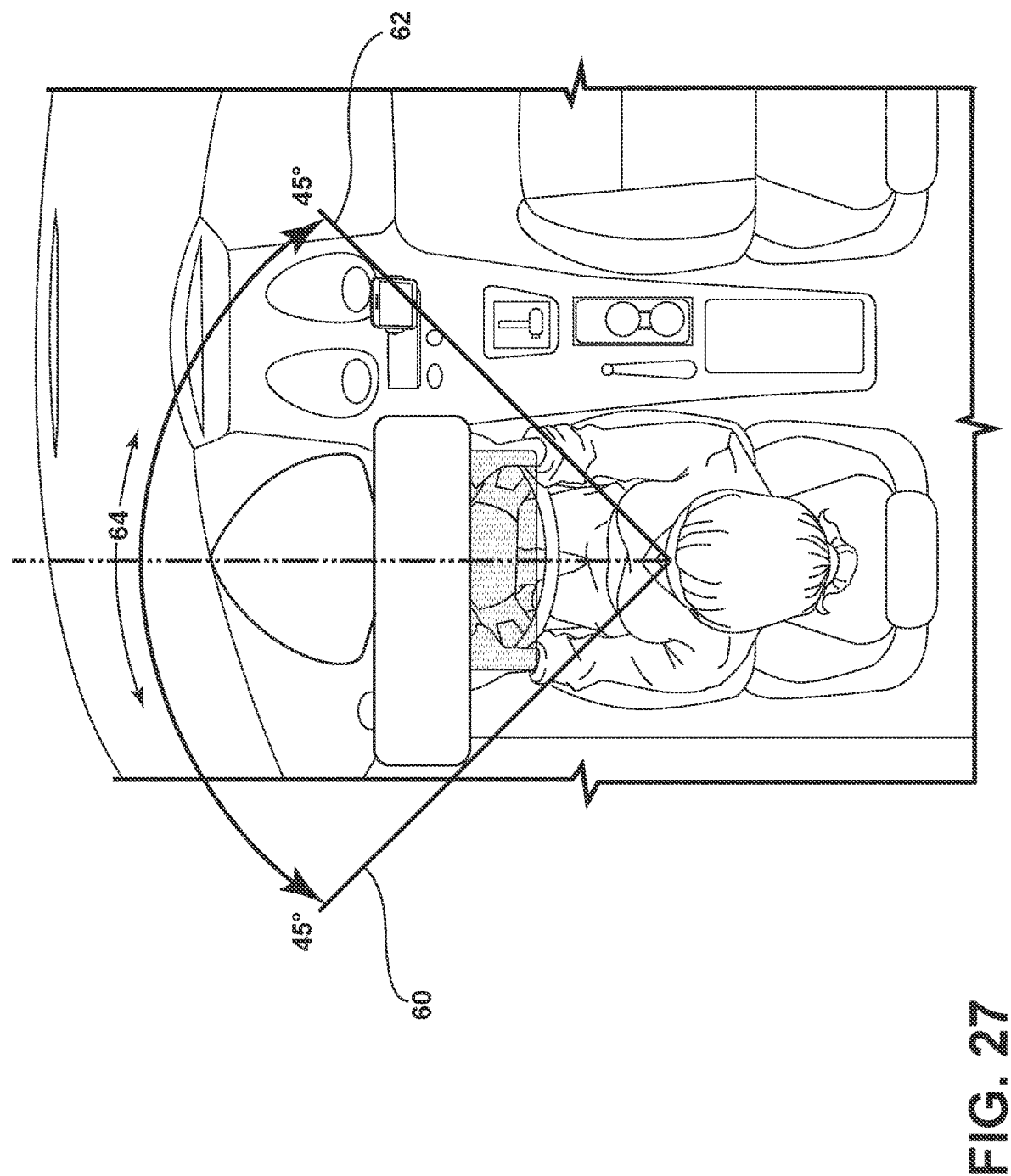
FIG. 27 illustrates a top view of the HUD Visor of FIG. 4, in place in a vehicle, with the HUD screen in a second intermediate position, and further illustrating a typical driver's field of vision.
Figure 28:
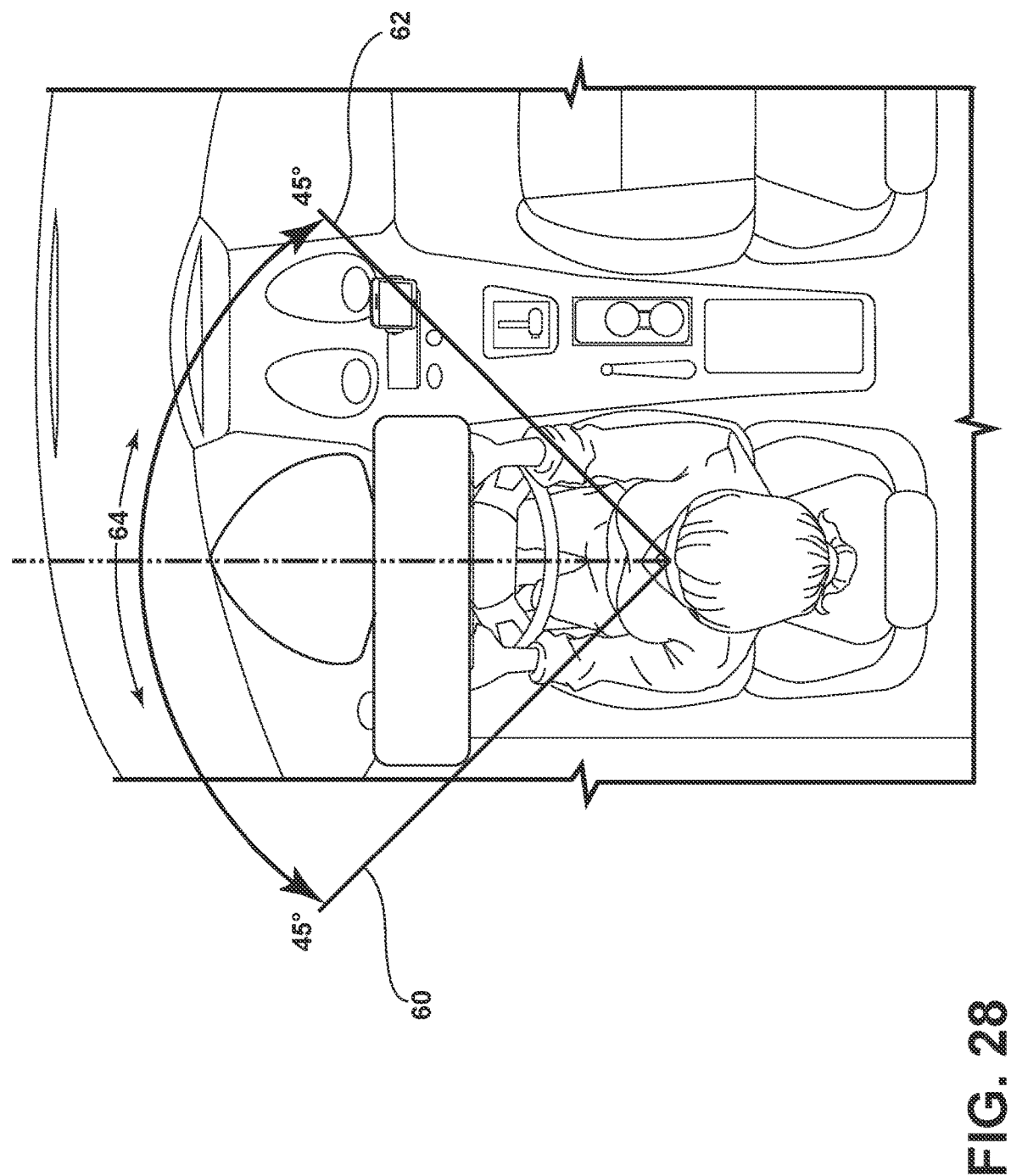
FIG. 28 illustrates a top view of the HUD Visor of FIG. 4, in place in a vehicle, with the HUD screen in a deployed position, and further illustrating a typical driver's field of vision.
Figure 29:
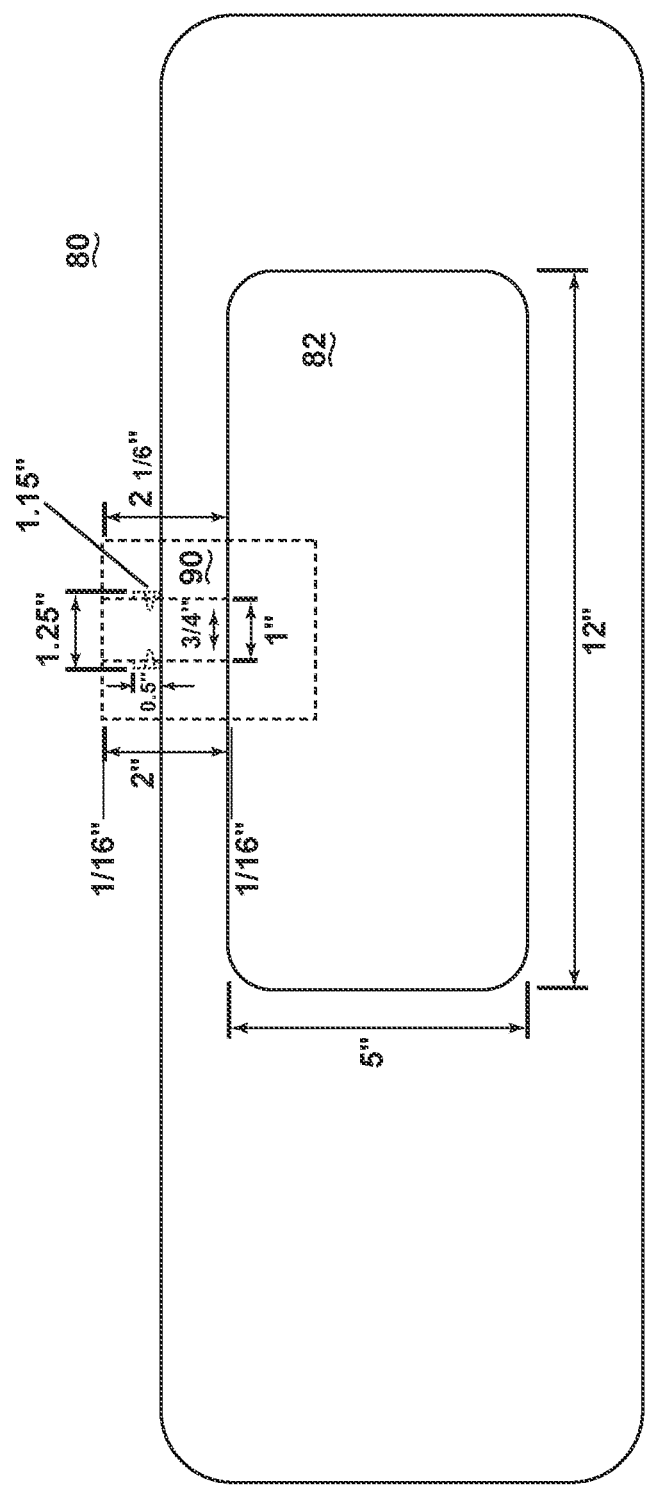
FIG. 29 illustrates a schematic top view of another embodiment of a HUD Visor including a miniature projection device for projection of information onto the transparent screen of the HUD Visor.
Figure 30:
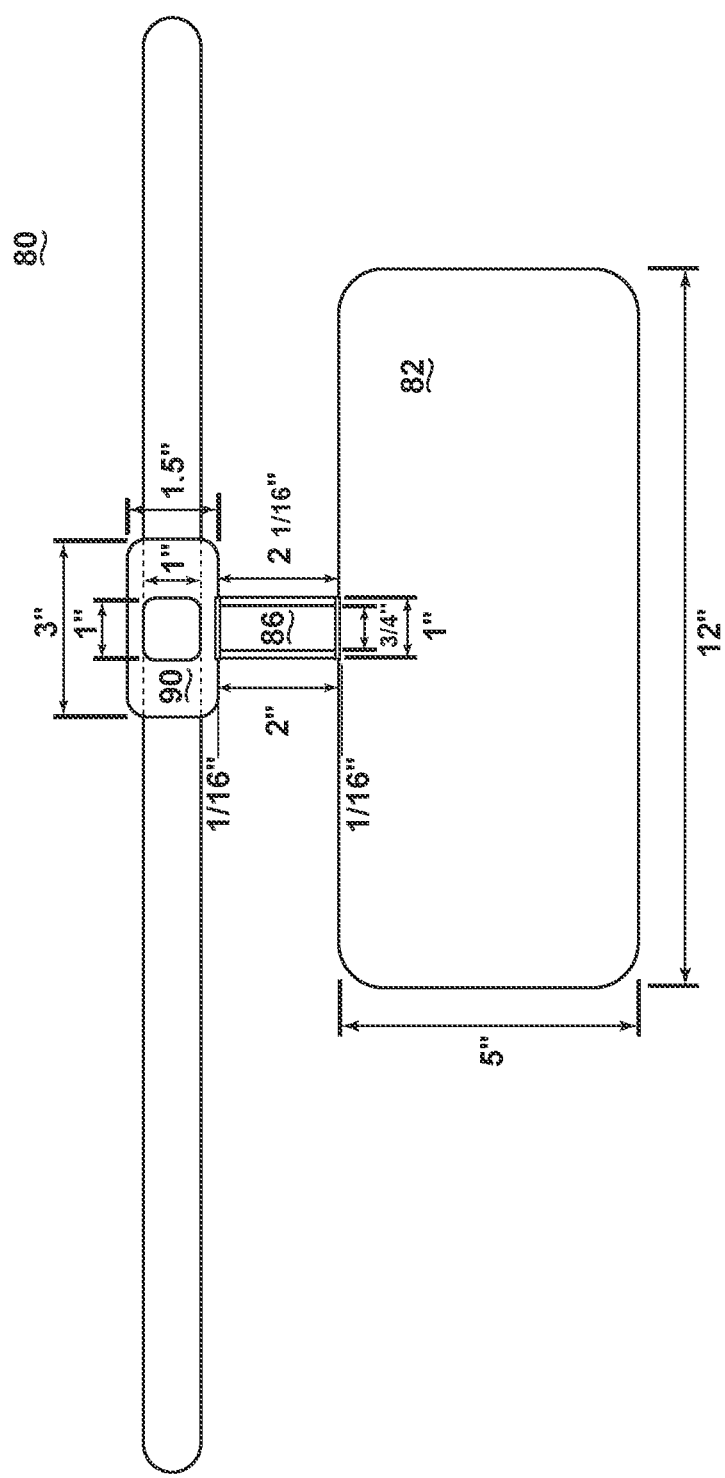
FIG. 30 illustrates a schematic front view of the HUD Visor of FIG. 29, in an unfolded configuration, but with the screen and projector in a closed position.
Figure 31:
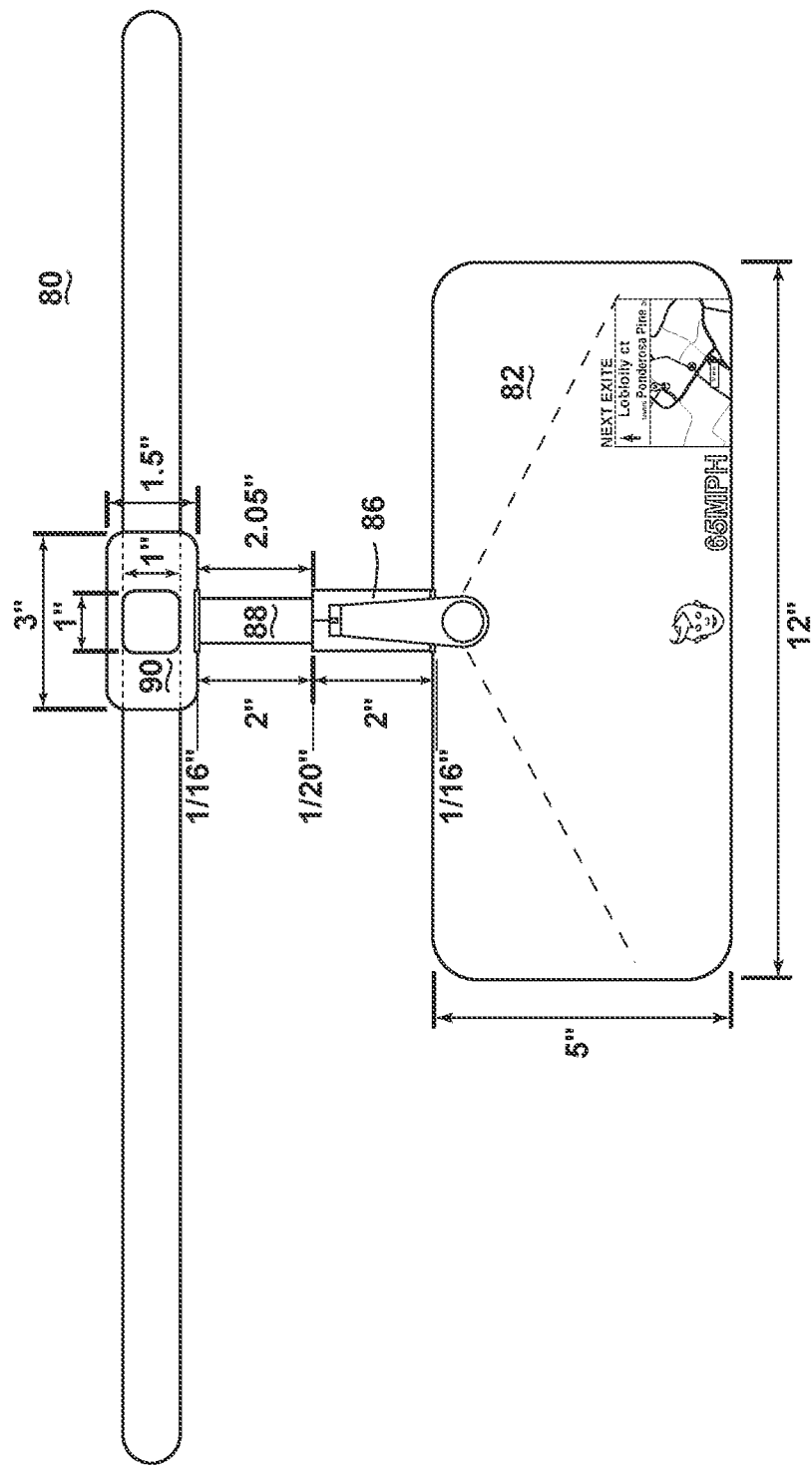
FIG. 31 illustrates a schematic front view of the HUD Visor of FIG. 29, in an unfolded configuration with the screen and projector in an open and activated position.
Figure 32:
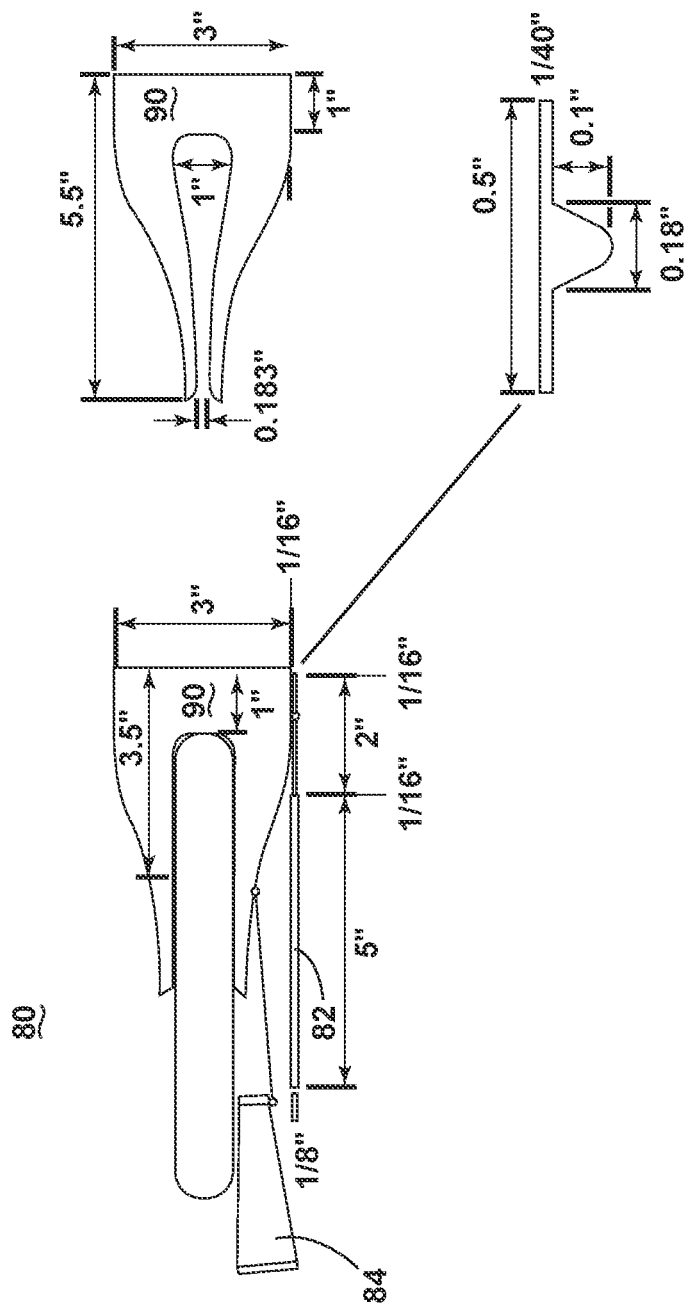
FIG. 32 illustrates a schematic side view of the HUD Visor of FIG. 29, in a folded configuration with the screen and projector in a closed position.
Figure 33:
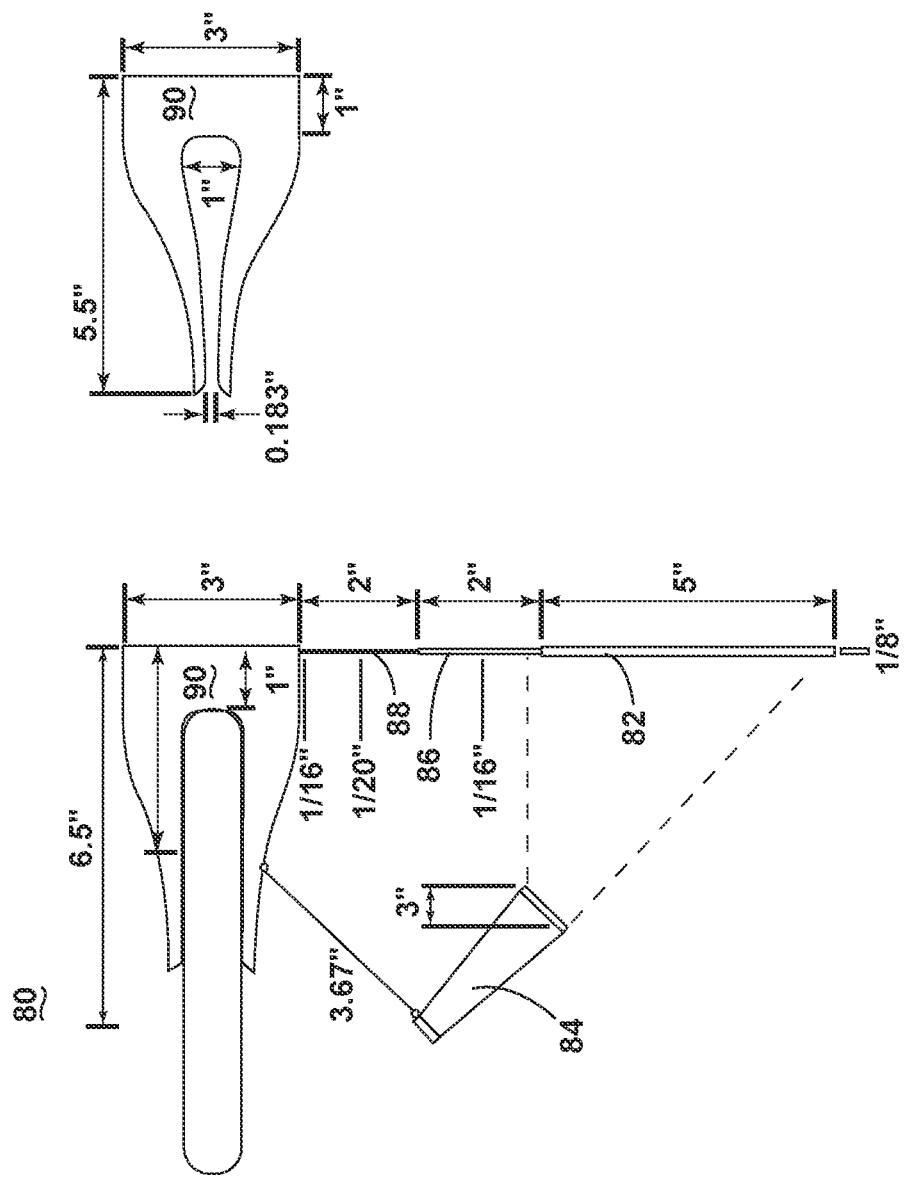
FIG. 33 illustrates a schematic side view of the HUD Visor of FIG. 29, in an unfolded configuration with the screen and projector in an open and activated position.

With reference to FIGS. 23-24, a driver's perspective view of the portable HUD visor 40, when the HUD display screen 46 is deployed and adjusted for driver height, is shown. Adjustability of the HUD display screen 46 for height and angle is accomplished by the same structures discussed above with respect to the HUD visor 10, with a principal difference being that the second connector 48 is connected to the visor clip 44.

With reference to FIGS. 25-28, a top view of the integrated HUD visor 10 is illustrated, with lines 60, 62 indicating the normal field of view 64 of a driver in a moving automobile, and showing how the HUD display screen 14, when deployed, includes a significant portion of that field of view.

In some embodiments, the HUD visor 10, 40 is linked to motion sensors and/or cameras on the exterior of the automobile, (not shown) including sensors and/or cameras that cover a field of view that is outside the normal field of view 64 of the driver. Upon sensing or determining that an object—such as a car or pedestrian 68—is outside of the driver's normal field of view 64, and may or may not be in the driver's peripheral view, but is moving toward the front of the car and may pose a collision hazard, a warning is displayed on the HUD display screen 14, 46 for the driver. Preferably, the warning indicates the direction from which the hazard is approaching, e.g., left or right.

According to a study by the Virginia Tech transportation institute (VTTI), navigating using a cell phone or screen that is not in the driver's line of vision, among other distractions, takes a driver's eyes off the road for an average of 4.6 seconds at a time. At 55 mph, this is the equivalent of driving blind for the length of an entire football field. Embodiments disclosed herein alleviate this problem.

With reference to FIGS. 29-33, a third embodiment of the HUD visor 80 is provided. This HUD visor 80 embodiment includes a display screen 82. The display screen 82 includes a transparent substrate, with a film overlay that is an emissive projector film, which responds to and/or reflects the light projected by a projector 84, such that information is displayed on the display screen for the driver. The transparent substrate may be any suitable material, including but not limited to Acrylonitrile Butadiene Styrene ("ABS"). Other suitable materials include but are not limited to a blend of Acrylonitrile Styrene and Polycarbonate Arylesor ("ASA+PC Blend"), Polyamide ("PA"), Phenolharz, Polymethyl Methacrylate ("PMMA") and Plexiglas.

The HUD visor 80 also includes a microprocessor (not shown) that is operably connected to a battery (not shown). The projector 84, is operably connected to the battery and the microprocessor, so that the microprocessor can transmit driver assistance information data to the projector 84. In turn, the projector 84 may convert the driver assistance information data into a projection image of driver assistance information, and the projector 84 then projects the projection image of driver assistance information onto the display screen 82. The projector 84 has a light source with a light source brightness output power of about 2 watts. Suitable projectors and compatible emissive projector film to fulfill these roles are commercially available from Sun Innovations, Inc. of Freemont, California. https://www.sun-innovations.com.

As with other embodiments described herein, the HUD visor 80 includes a first connector member 86 hingedly connected to the display screen 84, a second connector member 88 connected to the first connector member 86, a clip 90, and connected to the second connector member 88. The first connector member 86 and the second connector member 88 are in a telescoping arrangement. The clip 90 is configured to removably attach the heads-up display visor 80 to a conventional vehicle sun visor.

The HUD visor 80 may project a variety of types of information helpful to a driver, including one or more of vehicle speed information, vehicle performance information, engine condition, tire condition, tachometer information, environmental conditions, heating and air conditioner settings, entertainment conditions, stereo settings, navigation information, maps, turn-by-turn directions, interface information with other devices, interface information to a smartphone, connectivity information, connectivity to a Bluetooth headset, connectivity to a voice command system, driving condition warnings, an indication that the road is slippery, and an indication that a collision is imminent or an indication that the brakes should be applied.

The HUD visor 80 may have a rechargeable battery, or may accept conventional non-rechargeable alkaline batteries. In some embodiments, the HUD visor 80 is operably connected to a solar cell for recharging the rechargeable battery. Alternatively, the HUD visor 80 may include a USB charging port, and wherein the battery is operably connected to the USB charging port for recharging. The HUD visor 80 may include an RFID capable emergency button (not shown). The HUD visor display screen 84 can include an ultra-violet ("UV") light sensitive material, such that upon exposure to UV light, the UV light sensitive material darkens to act as a sunscreen for the driver, and wherein upon a reduction in the intensity of the UV light exposure, the UV light sensitive material lightens. The HUD visor 80 can include a radio antenna and a processor sufficient to provide Bluetooth connectivity, a microphone and a processor sufficient to provide voice command capability, a digital camera and a processor sufficient to provide facial recognition capability to identify the driver as the owner of the HUD visor 80, and/or a blood pressure reader.

Advantages and benefits of the embodiments disclosed herein are many and varied. There is no projection onto the windshield of a vehicle, thus eliminating the problem of a dirty or rain-soaked windshield interfering with the driver's ability to see information projected onto the windshield. There is no projector on the vehicle dashboard, thus simplifying use and construction, in that it does not need to be built into a vehicle dashboard, nor does it need to be placed onto a dashboard by suction cups, Velcro, glue or other affixing means. Embodiments having a visor clip are portable, so they can be moved from one vehicle to another. Preferred embodiments described herein are sized such that the display screen is only in the driver's arc of forward vision. This placement and dimension will reduce distracted driving by a user of these embodiments, when compared to driver assistance devices that are dashboard-mounted, center-console mounted, or which display on the windshield, because there is no need for the driver to look away from the road in order to see information on the display screen. Certain embodiments herein are operatively linked to motion sensors in the vehicle (or which are separately placed by the driver), so that the motion sensor data can be sent to the display screen in a way that provides a driver with an alert that there is an oncoming hazard approaching from outside the line of the driver's vision, toward the vehicles direction of travel, such as a pedestrian, or a deer. Certain other embodiments include a display screen that has UV-light sensitive coating, or composition, such that the display screen can darken to act as a sunscreen for the driver, when driving in bright sunlight conditions.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments disclosed.

Insofar as the description above discloses any additional subject matter that is not within the scope of the claims below, the inventions are not dedicated to the public and the right to file one or more applications to claim such additional inventions is reserved.

What is claimed is:

1. A portable heads-up display visor for a vehicle comprising:
    a display screen comprising a rigid transparent screen upon which driver assistance information may be displayed so that the driver assistance information is perceivable by a driver;
    a microprocessor;
    wherein the microprocessor is operably connected to a battery;
    wherein the display screen is operably connected to the battery;
    wherein the display screen is operably connected to the microprocessor such that the microprocessor can transmit driver assistance information data to the display screen such that the display screen displays an image of driver assistance information;
    a clip, operably connected to the display screen;
    wherein the clip is configured to removably clasp the heads-up display visor to a conventional vehicle sun visor.

2. The heads-up display visor of claim 1 wherein the clip comprises a clasp.

3. The heads-up display visor of claim 2 wherein the clasp comprises:
    a first arm;
    a second arm;
    wherein the first arm and the second arm are biased towards each other, such that when the clasp is placed on a conventional vehicle sun visor, the first arm and the second arm removably secure the display visor to the conventional vehicle sun visor by pressure.

4. The heads-up display visor of claim 1 further comprising:
    a first connector member;
    wherein the first connector member, is hingedly connected to the clip; and
    wherein the first connector member is connected to the display screen.

5. The heads-up display visor of claim 1 further comprising:
    a first connector member;
    wherein the first connector member is hingedly connected to the clip;
    a second connector member;
    wherein the second connector member is connected to the display screen; and
    wherein the first connector member and the second connector member are connected such that the second connector member may extend away from the first connector member by telescoping;
    whereby, when the clip is removably secured to a conventional vehicle sun visor, a user can adjust the height of the display screen by adjusting the distance between the clip and the display screen.

6. The heads-up display visor of claim 1 wherein the display screen comprises an emissive projector film applied to a rigid transparent substrate.

7. The heads-up display visor of claim 1 wherein the rigid transparent substrate comprises Acrylonitrile Butadiene Styrene ("ABS").

8. The heads-up display visor of claim 1 further comprising:
    a motion sensor, operatively connected to the microprocessor;
    wherein the motion sensor is aligned to sense motion that occurs beyond the driver's peripheral line of sight, wherein the peripheral line of sight is more than 45 degrees away from the driver's forward line of sight;
    wherein the microprocessor is operatively configured such that, upon receiving a motion detection signal from the motion sensor, the microprocessor will cause a visual warning signal to appear on the display screen to warn the driver about a hazard beyond the driver's peripheral line of sight.

9. The heads-up display visor of claim 1 wherein the image of driver assistance information comprises one or more of vehicle speed information, vehicle performance information, engine condition, tire condition, tachometer information, environmental conditions, heating and air conditioner settings, entertainment conditions, stereo settings, navigation information, maps, turn-by-turn directions, interface information with other devices, interface information to a smartphone, connectivity information, connectivity to a Bluetooth headset, connectivity to a voice command system, driving condition warnings, an indication that the road is slippery, an indication that a collision is imminent or an indication that the brakes should be applied.

10. The heads-up display visor of claim 1 wherein the battery is rechargeable.

11. The heads-up display visor of claim 10, and wherein the battery is operably connected to a solar cell for recharging.

12. The heads-up display visor of claim 10, further comprising a USB charging port, and wherein the battery is operably connected to the USB charging port for recharging.

13. The heads-up display visor of claim 1 further comprising an RFID capable emergency button.

14. The heads-up display visor of claim 1, wherein the display screen further comprises a ultra-violet ("UV") light sensitive material and wherein upon exposure to UV light, the UV light sensitive material darkens to act as a sunscreen for the driver, and wherein upon a reduction in the intensity of the UV light exposure, the UV light sensitive material lightens.

15. The heads-up display visor of claim 1, further comprising a radio antenna and a processor sufficient to provide Bluetooth connectivity.

16. The heads-up display visor of claim 1, further comprising a microphone and a processor sufficient to provide voice command capability.

17. The heads-up display visor of claim 1, further comprising a digital camera and a processor sufficient to provide facial recognition capability to identify the driver as the owner of the heads-up display visor.

18. The heads-up display visor of claim 1, further comprising a blood pressure reader.

19. The heads-up display visor of claim 1 wherein the screen comprises a liquid crystal display ("LCD") screen.

20. The heads-up display visor of claim 1 wherein the screen comprises a light emitting diode ("LED") screen.

* * * * *